(12) United States Patent
Wei et al.

(10) Patent No.: US 10,650,121 B1
(45) Date of Patent: May 12, 2020

(54) REAL TIME DIGITAL CONTENT CONCEALMENT

(71) Applicant: Citrix Systems, Inc., Fort Lauderdale, FL (US)

(72) Inventors: Daowen Wei, Nanjing (CN); Jian Ding, Nanjing (CN); Hengbo Wang, Nanjing (CN)

(73) Assignee: Citrix Systems, Inc., Fort Lauderdale, FL (US)

( * ) Notice: Subject to any disclaimer, the term of this patent is extended or adjusted under 35 U.S.C. 154(b) by 0 days.

(21) Appl. No.: 16/242,222

(22) Filed: Jan. 8, 2019

Related U.S. Application Data

(63) Continuation of application No. PCT/CN2018/119205, filed on Dec. 4, 2018.

(51) Int. Cl.
*G06F 21/00* (2013.01)
*G06F 21/10* (2013.01)
*G06K 9/00* (2006.01)
*G06T 11/60* (2006.01)
*G06F 17/27* (2006.01)
*G06F 17/24* (2006.01)

(52) U.S. Cl.
CPC .............. *G06F 21/10* (2013.01); *G06F 17/24* (2013.01); *G06F 17/2775* (2013.01); *G06K 9/00288* (2013.01); *G06K 9/00496* (2013.01); *G06T 11/60* (2013.01); *G06F 2221/0748* (2013.01)

(58) Field of Classification Search
None
See application file for complete search history.

(56) References Cited

U.S. PATENT DOCUMENTS

| | | | |
|---|---|---|---|
| 7,788,701 B1* | 8/2010 | Lavin | G06F 21/6209 713/165 |
| 2005/0114672 A1* | 5/2005 | Duncan | G06F 21/10 713/182 |

(Continued)

FOREIGN PATENT DOCUMENTS

| | | |
|---|---|---|
| CN | 106650367 A | 5/2017 |
| CN | 107145800 A | 9/2017 |

(Continued)

OTHER PUBLICATIONS

Aug. 30, 2019 (WO) International Search Report and Written Opinion—App. PCT/CN2018/119205.

*Primary Examiner* — Maung T Lwin
(74) *Attorney, Agent, or Firm* — Banner & Witcoff, Ltd.

(57) ABSTRACT

Methods and systems for performing real time digital content concealment are described herein. A computing device may, in response to detecting a user within view of an image capture device of a client device, perform a first type of text recognition on a first region of digital content and a second type of text recognition on a second region of the digital content, where the first type of text recognition is determined based on a first type of content items contained in the first region and the second type of text recognition is determined based on a second type of content items contained in the second region. Based at least in part on rules corresponding to the user, the computing device may determine content items within the digital content to be concealed, and may modify the digital content to conceal the content items.

20 Claims, 14 Drawing Sheets

(56) References Cited

U.S. PATENT DOCUMENTS

| | | | |
|---|---|---|---|
| 2011/0179366 A1 | 7/2011 | Chae | |
| 2016/0063224 A1* | 3/2016 | Raley | G06F 21/105 726/29 |
| 2016/0132683 A1* | 5/2016 | Bostick | G06F 21/60 726/26 |
| 2016/0378999 A1* | 12/2016 | Panchapakesan | G06F 21/6254 726/26 |

FOREIGN PATENT DOCUMENTS

| | | |
|---|---|---|
| CN | 107835118 A | 3/2018 |
| CN | 108304707 A | 7/2018 |

* cited by examiner

REAL TIME DIGITAL CONTENT CONCEALMENT

CROSS-REFERENCE TO RELATED APPLICATIONS

The present application claims priority to International Application No. PCT/CN18/119205, filed Dec. 4, 2018, and entitled "Real Time Digital Content Concealment," which is hereby incorporated by reference as to its entirety.

FIELD

Aspects described herein generally relate to computers and processing systems for displaying digital content. In particular, one or more aspects of the disclosure relate to identifying individuals observing displayed content and concealing digital content from display according to rules, policies, and databases based on viewership of the content.

BACKGROUND

Many organizations and individuals rely on content displays to convey information that, in some circumstances, may be private or inappropriate for particular viewers. Accordingly, individuals may use generic privacy screens, or may even attempt to manually block the displays, so as limit display of such information. In many instances, viewers may change as people enter and leave an area containing the display, resulting in overexposure and/or over concealment of the information displayed.

SUMMARY

The following presents a simplified summary of various aspects described herein. This summary is not an extensive overview, and is not intended to identify required or critical elements or to delineate the scope of the claims. The following summary merely presents some concepts in a simplified form as an introductory prelude to the more detailed description provided below.

To overcome limitations in the prior art described above (e.g., overexposure and/or over concealment of information in the use of generic privacy screens), and to overcome other limitations that will be apparent upon reading and understanding the present specification, aspects described herein are directed towards systems and methods for performing real time digital content concealment based on individuals.

In accordance with one or more embodiments of the disclosure, a system comprising at least one processor and a memory, and may, in response to detecting a user within view of an image capture device of a client device perform a first type of text recognition on a first region of digital content displayed by the client device and a second type of text recognition on a second region of the digital content displayed by the client device, where the first type of text recognition is determined based on a first type of content items contained in the first region and the second type of text recognition is determined based on a second type of content items contained in the second region. Based at least in part on rules corresponding to the groups to the user, the system may determine content items within the digital content to be concealed. The system may modify the digital content so as to conceal the content items from view of the user while the client device displays the digital content. The system may display, via the client device, the modified digital content to the user, where the modified digital content does not contain the determined content items.

In one or more embodiments, the system may establish a wireless data connection with the client device. While the wireless data connection is established, the system may receive an indication of a first change in the groups to which present users belong, where the first type of text recognition and the second type of text recognition are performed in response to receiving the indication of the first change in the groups to which present users belong.

In one or more embodiments, the system may identify, based on the groups to which present users belong, the one or more content items to be concealed. In one or more embodiments, the system may identify the one or more content items to be concealed by determining that the text recognized in the digital content corresponds to words identified by policies corresponding to each group to which present users belong.

In one or more embodiments, the groups to which present users belong may be defined based on user age or employment status of present users. In one or more embodiments, the first region may contain plain text, the second region may contain text in an image, and a third region may contain text in video.

In one or more embodiments, the system may monitor, at a predefined interval, the groups to which present users belong and the digital content to determine the change. In some embodiments, the system may determine, in response to a second change in groups to which present users belong, that the modified digital content should be modified to allow display of the content items. The system may modify the modified digital content to allow display of the determined content items by returning the modified digital content to a pre-modification state.

In one or more embodiments, the system may determine, in response to a second change in the content, that the updated content contains one or more additional words to be concealed. The system may modify the updated content to cause the positions of the one or more additional words to be concealed to correspond to the uniform color.

In one or more embodiments, the system may determine the change in groups to which present users belong by performing facial recognition to determine an identifier corresponding to each user in view of the image capture device of the client device and determining at least one identifier corresponding to a new group to which present users belong by comparison of the determined identifiers to a stored database of correlations between a list of identifiers and a list of groups to which present users belong.

These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

As a general introduction to the subject matter described in more detail below, aspects described herein are directed towards a method for performing real time digital content concealment based on user groups. The method describes an end to end framework empowered by deep learning techniques that, in some applications, detect and recognize plain text, scene text in natural images, and video text. In one or more instances, the method may be used to conceal digital content in streaming content, documents (e.g., word processing files, portable document format (PDF) files, or the like), applications (e.g., graphical user interfaces, or the like), or the like. The method then conceals text/images in real time based on users determined to be present in front of a screen displaying content that includes the text/images.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

Computing Architecture

Figure 1:
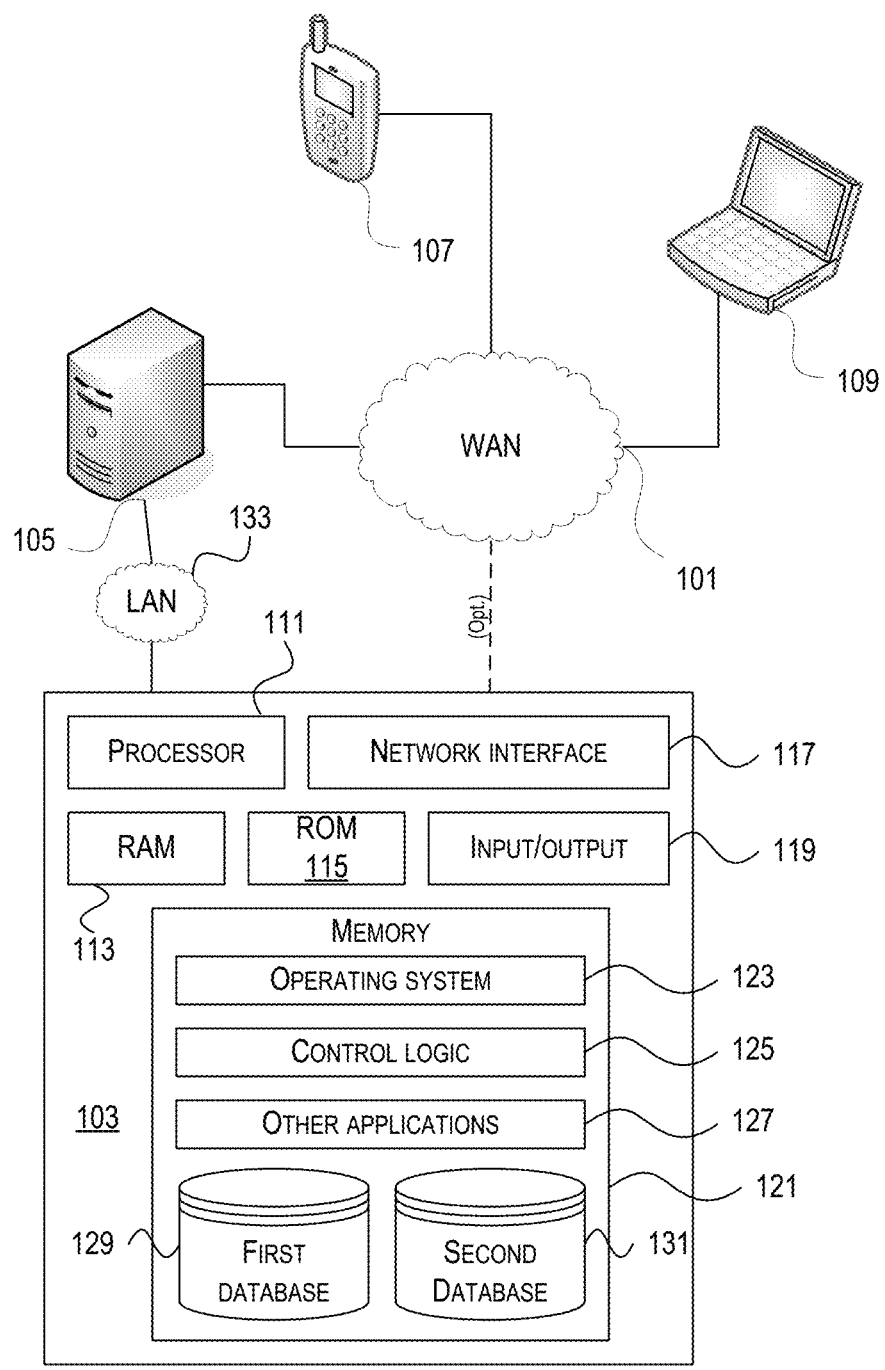
FIG. 1 depicts an illustrative computer system architecture that may be used in accordance with one or more illustrative aspects described herein.

Computer software, hardware, and networks may be utilized in a variety of different system environments, including standalone, networked, remote-access (also known as remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, local area networks (LAN), metropolitan area networks (MAN), wireless networks, personal networks (PAN), and the like. Network 101 is for illustration purposes and may be replaced with fewer or additional computer networks. A local area network 133 may have one or more of any known LAN topology and may use one or more of a variety of different protocols, such as Ethernet. Devices 103, 105, 107, and 109 and other devices (not shown) may be connected to one or more of the networks via twisted pair wires, coaxial cable, fiber optics, radio waves, or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the local area network 133, the wide area network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the data server 103. Data server 103 may further include random access memory (RAM) 113, read only memory (ROM) 115, network interface 117, input/output interfaces 119 (e.g., keyboard, mouse, display, printer, etc.), and memory 121. Input/output (I/O) 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or might not be used in conjunction with aspects described herein. The control logic 125 may also be referred to herein as the data server software 125. Functionality of the data server software 125 may refer to operations or decisions made automatically based on rules coded into the control logic 125, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database 129 may include the second database 131 (e.g., as a separate table, report, etc.). That is, the information can be stored in a single database, or separated into different logical, virtual, or physical databases, depending on system design. Devices 105, 107, and 109 may have similar or different architecture as described with respect to device 103. Those of skill in the art will appreciate that the functionality of data processing device 103 (or device 105, 107, or 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HyperText Markup Language (HTML) or Extensible Markup Language (XML). The computer executable instructions may be stored on a computer readable medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware, and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
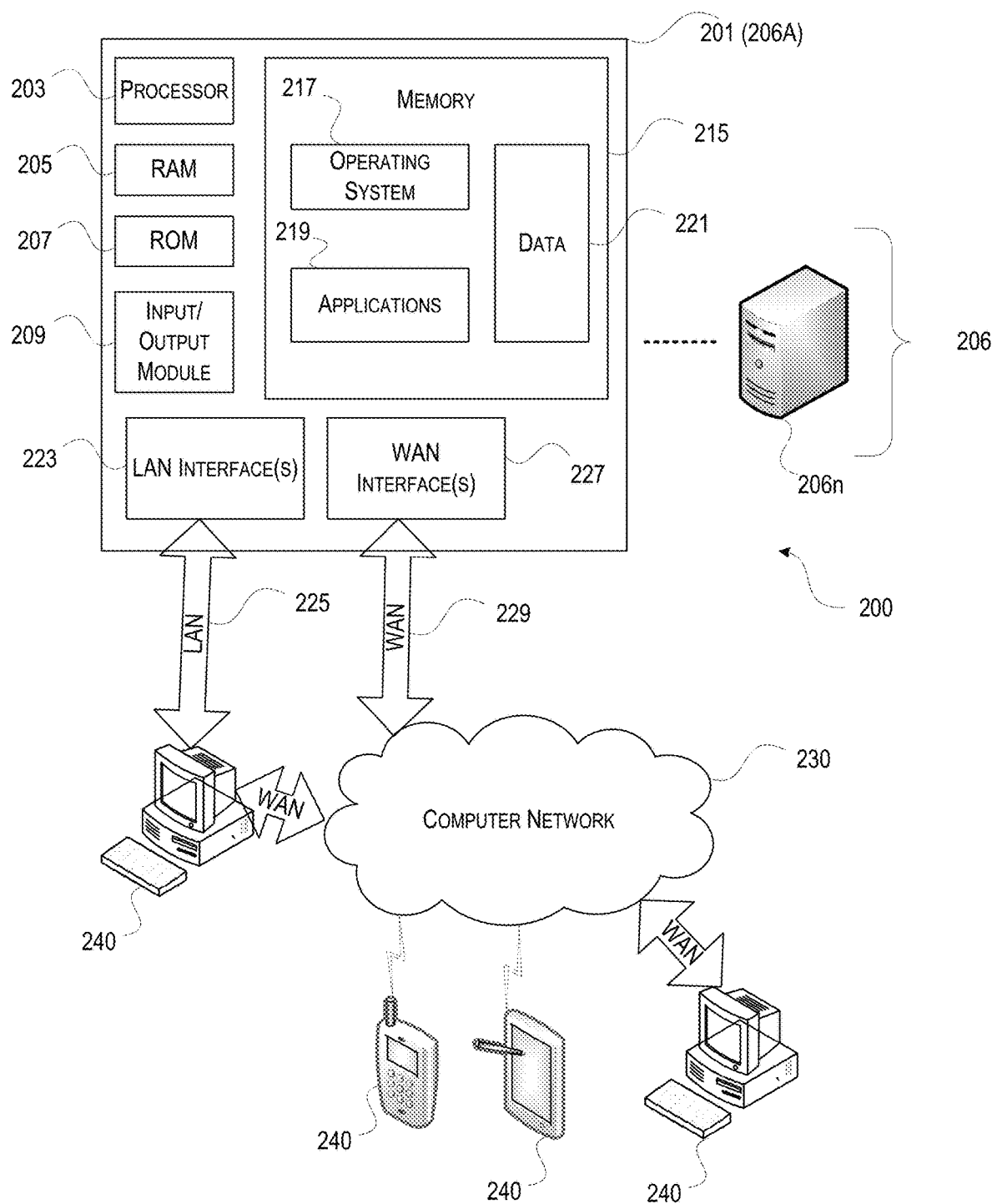
FIG. 2 depicts an illustrative remote-access system architecture that may be used in accordance with one or more illustrative aspects described herein.

With further reference to FIG. 2, one or more aspects described herein may be implemented in a remote-access environment. FIG. 2 depicts an example system architecture including a computing device 201 in an illustrative computing environment 200 that may be used according to one or more illustrative aspects described herein. Computing device 201 may be used as a server 206a in a single-server or multi-server desktop virtualization system (e.g., a remote access or cloud system) and can be configured to provide virtual machines for client access devices. The computing device 201 may have a processor 203 for controlling overall operation of the device 201 and its associated components, including RAM 205, ROM 207, Input/Output (I/O) module 209, and memory 215.

I/O module 209 may include a mouse, keypad, touch screen, scanner, optical reader, and/or stylus (or other input device(s)) through which a user of computing device 201 may provide input, and may also include one or more of a speaker for providing audio output and one or more of a video display device for providing textual, audiovisual, and/or graphical output. Software may be stored within memory 215 and/or other storage to provide instructions to processor 203 for configuring computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices). The terminals 240 may be personal computers, mobile devices, laptop computers, tablets, or servers that include many or all of the elements described above with respect to the computing device 103 or 201. The network connections depicted in FIG. 2 include a local area network (LAN) 225 and a wide area network (WAN) 229, but may also include other networks. When used in a LAN networking environment, computing device 201 may be connected to the LAN 225 through a network interface or adapter 223. When used in a WAN networking environment, computing device 201 may include a modem or other wide area network interface 227 for establishing communications over the WAN 229, such as computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, personal digital assistants (PDAs), notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network personal computers (PCs), minicomputers, mainframe computers, distributed computing environments that include any of the above systems or devices, and the like.

As shown in FIG. 2, one or more client devices 240 may be in communication with one or more servers 206a-206n (generally referred to herein as "server(s) 206"). In one embodiment, the computing environment 200 may include a network appliance installed between the server(s) 206 and client machine(s) 240. The network appliance may manage client/server connections, and in some cases can load balance client connections amongst a plurality of backend servers 206.

The client machine(s) 240 may in some embodiments be referred to as a single client machine 240 or a single group of client machines 240, while server(s) 206 may be referred to as a single server 206 or a single group of servers 206. In one embodiment a single client machine 240 communicates with more than one server 206, while in another embodiment a single server 206 communicates with more than one client machine 240. In yet another embodiment, a single client machine 240 communicates with a single server 206.

A client machine 240 can, in some embodiments, be referenced by any one of the following non-exhaustive terms: client machine(s); client(s); client computer(s); client device(s); client computing device(s); local machine; remote machine; client node(s); endpoint(s); or endpoint node(s). The server 206, in some embodiments, may be referenced by any one of the following non-exhaustive terms: server(s), local machine; remote machine; server farm(s), or host computing device(s).

In one embodiment, the client machine 240 may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in other aspects the virtual machine may be managed by a hypervisor executing on a server 206 or a hypervisor executing on a client 240.

Some embodiments include a client device 240 that displays application output generated by an application remotely executing on a server 206 or other remotely located machine. In these embodiments, the client device 240 may execute a virtual machine receiver program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206, in some embodiments, uses a remote presentation protocol or other program to send data to a thin-client or remote-display application executing on the client to present display output generated by an application executing on the server 206. The thin-client or remote-display protocol can be any one of the following non-exhaustive list of protocols: the Independent Computing Architecture (ICA) protocol developed by Citrix Systems, Inc. of Ft. Lauderdale, Fla.; or the Remote Desktop Protocol (RDP) manufactured by the Microsoft Corporation of Redmond, Wash.

A remote computing environment may include more than one server 206a-206n such that the servers 206a-206n are logically grouped together into a server farm 206, for example, in a cloud computing environment. The server farm 206 may include servers 206 that are geographically dispersed while logically grouped together, or servers 206 that are located proximate to each other while logically grouped together. Geographically dispersed servers 206a-206n within a server farm 206 can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments the server farm 206 may be administered as a single entity, while in other embodiments the server farm 206 can include multiple server farms.

In some embodiments, a server farm may include servers 206 that execute a substantially similar type of operating system platform (e.g., WINDOWS, UNIX, LINUX, iOS, ANDROID, SYMBIAN, etc.) In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a Secure Sockets Layer (SSL) VPN server, a firewall, a web server, an application server or as a master application server, a server executing an active directory, or a server executing an application acceleration program that provides firewall functionality, application functionality, or load balancing functionality. Other server types may also be used.

Some embodiments include a first server 206a that receives requests from a client machine 240, forwards the request to a second server 206b (not shown), and responds to the request generated by the client machine 240 with a response from the second server 206b (not shown.) First server 206a may acquire an enumeration of applications available to the client machine 240 as well as address information associated with an application server 206 hosting an application identified within the enumeration of applications. First server 206a can then present a response to the client's request using a web interface, and communicate directly with the client 240 to provide the client 240 with access to an identified application. One or more clients 240 and/or one or more servers 206 may transmit data over network 230, e.g., network 101.

Figure 3:
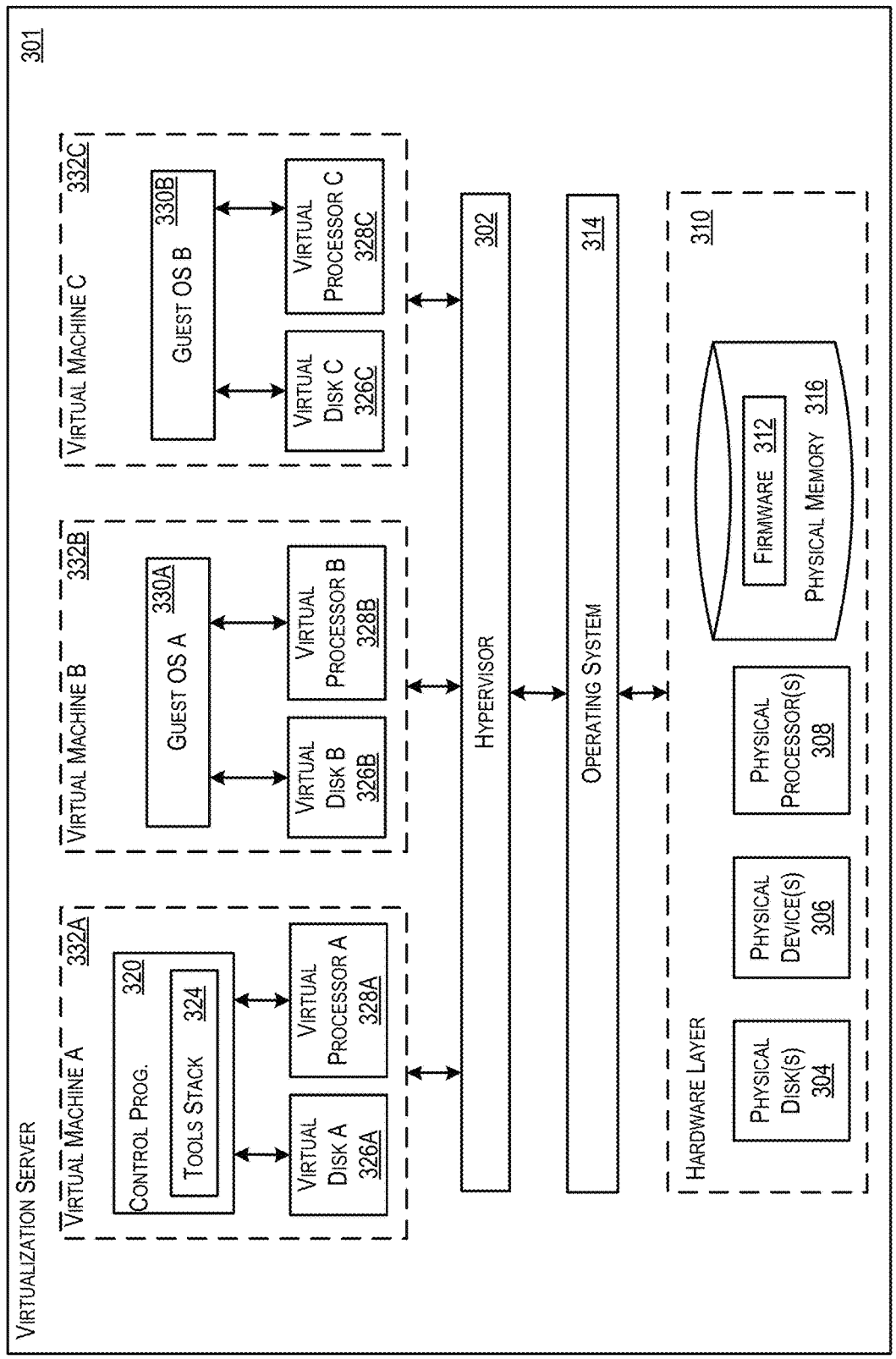
FIG. 3 depicts an illustrative virtualized (hypervisor) system architecture that may be used in accordance with one or more illustrative aspects described herein.

FIG. 3 shows a high-level architecture of an illustrative desktop virtualization system. As shown, the desktop virtualization system may be single-server or multi-server system, or cloud system, including at least one virtualization server 301 configured to provide virtual desktops and/or virtual applications to one or more client access devices 240. As used herein, a desktop refers to a graphical environment or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device, or executed on a remotely located device (e.g., remoted).

A computer device 301 may be configured as a virtualization server in a virtualization environment, for example, a single-server, multi-server, or cloud computing environment. Virtualization server 301 illustrated in FIG. 3 can be deployed as and/or implemented by one or more embodiments of the server 206 illustrated in FIG. 2 or by other known computing devices. Included in virtualization server 301 is a hardware layer that can include one or more physical disks 304, one or more physical devices 306, one or more physical processors 308, and one or more physical memories 316. In some embodiments, firmware 312 can be stored within a memory element in the physical memory 316 and can be executed by one or more of the physical processors 308. Virtualization server 301 may further include an operating system 314 that may be stored in a memory element in the physical memory 316 and executed by one or more of the physical processors 308. Still further, a hypervisor 302 may be stored in a memory element in the physical memory 316 and can be executed by one or more of the physical processors 308.

Executing on one or more of the physical processors 308 may be one or more virtual machines 332A-C (generally 332). Each virtual machine 332 may have a virtual disk 326A-C and a virtual processor 328A-C. In some embodiments, a first virtual machine 332A may execute, using a virtual processor 328A, a control program 320 that includes a tools stack 324. Control program 320 may be referred to as a control virtual machine, Dom0, Domain 0, or other virtual machine used for system administration and/or control. In some embodiments, one or more virtual machines 332B-C can execute, using a virtual processor 328B-C, a guest operating system 330A-B.

Virtualization server 301 may include a hardware layer 310 with one or more pieces of hardware that communicate with the virtualization server 301. In some embodiments, the hardware layer 310 can include one or more physical disks 304, one or more physical devices 306, one or more physical processors 308, and one or more physical memory 316. Physical components 304, 306, 308, and 316 may include, for example, any of the components described above. Physical devices 306 may include, for example, a network interface card, a video card, a keyboard, a mouse, an input device, a monitor, a display device, speakers, an optical drive, a storage device, a universal serial bus connection, a printer, a scanner, a network element (e.g., router, firewall, network address translator, load balancer, virtual private network (VPN) gateway, Dynamic Host Configuration Protocol (DHCP) router, etc.), or any device connected to or communicating with virtualization server 301. Physical memory 316 in the hardware layer 310 may include any type of memory. Physical memory 316 may store data, and in some embodiments may store one or more programs, or set of executable instructions. FIG. 3 illustrates an embodiment where firmware 312 is stored within the physical memory 316 of virtualization server 301. Programs or executable instructions stored in the physical memory 316 can be executed by the one or more processors 308 of virtualization server 301.

Virtualization server 301 may also include a hypervisor 302. In some embodiments, hypervisor 302 may be a program executed by processors 308 on virtualization server 301 to create and manage any number of virtual machines 332. Hypervisor 302 may be referred to as a virtual machine monitor, or platform virtualization software. In some embodiments, hypervisor 302 can be any combination of executable instructions and hardware that monitors virtual machines executing on a computing machine. Hypervisor 302 may be Type 2 hypervisor, where the hypervisor executes within an operating system 314 executing on the virtualization server 301. Virtual machines may then execute at a level above the hypervisor 302. In some embodiments, the Type 2 hypervisor may execute within the context of a user's operating system such that the Type 2 hypervisor interacts with the user's operating system. In other embodiments, one or more virtualization servers 301 in a virtualization environment may instead include a Type 1 hypervisor (not shown). A Type 1 hypervisor may execute on the virtualization server 301 by directly accessing the hardware and resources within the hardware layer 310. That is, while a Type 2 hypervisor 302 accesses system resources through a host operating system 314, as shown, a Type 1 hypervisor may directly access all system resources without the host operating system 314. A Type 1 hypervisor may execute directly on one or more physical processors 308 of virtualization server 301, and may include program data stored in the physical memory 316.

Hypervisor 302, in some embodiments, can provide virtual resources to operating systems 330 or control programs 320 executing on virtual machines 332 in any manner that simulates the operating systems 330 or control programs 320 having direct access to system resources. System resources can include, but are not limited to, physical devices 306, physical disks 304, physical processors 308, physical memory 316, and any other component included in hardware layer 310 of the virtualization server 301. Hypervisor 302 may be used to emulate virtual hardware, partition physical hardware, virtualize physical hardware, and/or execute virtual machines that provide access to computing environments. In still other embodiments, hypervisor 302 may control processor scheduling and memory partitioning for a virtual machine 332 executing on virtualization server 301. Hypervisor 302 may include those manufactured by VMWare, Inc., of Palo Alto, Calif.; the XENPROJECT hypervisor, an open source product whose development is overseen by the open source XenProject.org community; HyperV, VirtualServer or virtual PC hypervisors provided by Microsoft, or others. In some embodiments, virtualization server 301 may execute a hypervisor 302 that creates a virtual machine platform on which guest operating systems may execute. In these embodiments, the virtualization server 301 may be referred to as a host server. An example of such a virtualization server is the XENSERVER provided by Citrix Systems, Inc., of Fort Lauderdale, Fla.

Hypervisor 302 may create one or more virtual machines 332B-C (generally 332) in which guest operating systems 330 execute. In some embodiments, hypervisor 302 may load a virtual machine image to create a virtual machine 332. In other embodiments, the hypervisor 302 may execute a guest operating system 330 within virtual machine 332. In still other embodiments, virtual machine 332 may execute guest operating system 330.

In addition to creating virtual machines 332, hypervisor 302 may control the execution of at least one virtual machine 332. In other embodiments, hypervisor 302 may present at least one virtual machine 332 with an abstraction of at least one hardware resource provided by the virtualization server 301 (e.g., any hardware resource available within the hardware layer 310). In other embodiments, hypervisor 302 may control the manner in which virtual machines 332 access physical processors 308 available in virtualization server 301. Controlling access to physical processors 308 may include determining whether a virtual machine 332 should have access to a processor 308, and how physical processor capabilities are presented to the virtual machine 332.

As shown in FIG. 3, virtualization server 301 may host or execute one or more virtual machines 332. A virtual machine 332 is a set of executable instructions that, when executed by a processor 308, may imitate the operation of a physical computer such that the virtual machine 332 can execute programs and processes much like a physical computing device. While FIG. 3 illustrates an embodiment where a virtualization server 301 hosts three virtual machines 332, in other embodiments virtualization server 301 can host any number of virtual machines 332. Hypervisor 302, in some embodiments, may provide each virtual machine 332 with a unique virtual view of the physical hardware, memory, processor, and other system resources available to that virtual machine 332. In some embodiments, the unique virtual view can be based on one or more of virtual machine permissions, application of a policy engine to one or more virtual machine identifiers, a user accessing a virtual machine, the applications executing on a virtual machine, networks accessed by a virtual machine, or any other desired criteria. For instance, hypervisor 302 may create one or more unsecure virtual machines 332 and one or more secure virtual machines 332. Unsecure virtual machines 332 may be prevented from accessing resources, hardware, memory locations, and programs that secure virtual machines 332 may be permitted to access. In other embodiments, hypervisor 302 may provide each virtual machine 332 with a substantially similar virtual view of the physical hardware, memory, processor, and other system resources available to the virtual machines 332.

Each virtual machine 332 may include a virtual disk 326A-C (generally 326) and a virtual processor 328A-C (generally 328.) The virtual disk 326, in some embodiments, is a virtualized view of one or more physical disks 304 of the virtualization server 301, or a portion of one or more physical disks 304 of the virtualization server 301. The virtualized view of the physical disks 304 can be generated, provided, and managed by the hypervisor 302. In some embodiments, hypervisor 302 provides each virtual machine 332 with a unique view of the physical disks 304. Thus, in these embodiments, the particular virtual disk 326 included in each virtual machine 332 can be unique when compared with the other virtual disks 326.

A virtual processor 328 can be a virtualized view of one or more physical processors 308 of the virtualization server 301. In some embodiments, the virtualized view of the physical processors 308 can be generated, provided, and managed by hypervisor 302. In some embodiments, virtual processor 328 has substantially all of the same characteristics of at least one physical processor 308. In other embodiments, virtual processor 308 provides a modified view of physical processors 308 such that at least some of the characteristics of the virtual processor 328 are different than the characteristics of the corresponding physical processor 308.

Figure 4:
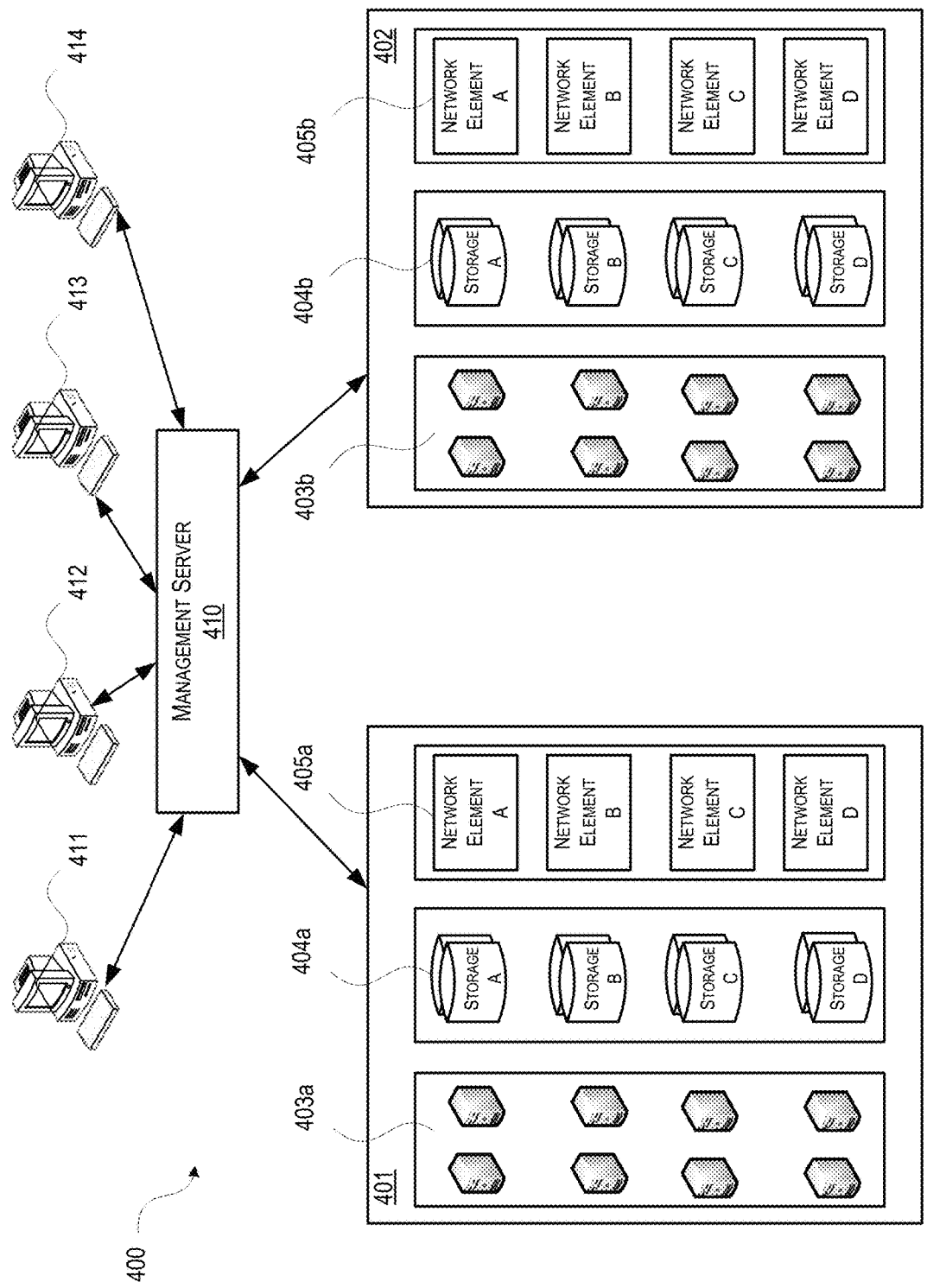
FIG. 4 depicts an illustrative cloud-based system architecture that may be used in accordance with one or more illustrative aspects described herein.

With further reference to FIG. 4, some aspects described herein may be implemented in a cloud-based environment. FIG. 4 illustrates an example of a cloud computing environment (or cloud system) 400. As seen in FIG. 4, client computers 411-414 may communicate with a cloud management server 410 to access the computing resources (e.g., host servers 403a-403b (generally referred herein as "host servers 403"), storage resources 404a-404b (generally referred herein as "storage resources 404"), and network elements 405a-405b (generally referred herein as "network resources 405")) of the cloud system.

Management server 410 may be implemented on one or more physical servers. The management server 410 may run, for example, CLOUDPLATFORM by Citrix Systems, Inc. of Ft. Lauderdale, Fla., or OPENSTACK, among others. Management server 410 may manage various computing resources, including cloud hardware and software resources, for example, host computers 403, data storage devices 404, and networking devices 405. The cloud hardware and software resources may include private and/or public components. For example, a cloud may be configured as a private cloud to be used by one or more particular customers or client computers 411-414 and/or over a private network. In other embodiments, public clouds or hybrid public-private clouds may be used by other customers over an open or hybrid networks.

Management server 410 may be configured to provide user interfaces through which cloud operators and cloud customers may interact with the cloud system 400. For example, the management server 410 may provide a set of application programming interfaces (APIs) and/or one or more cloud operator console applications (e.g., web-based or standalone applications) with user interfaces to allow cloud operators to manage the cloud resources, configure the virtualization layer, manage customer accounts, and perform other cloud administration tasks. The management server 410 also may include a set of APIs and/or one or more customer console applications with user interfaces configured to receive cloud computing requests from end users via client computers 411-414, for example, requests to create, modify, or destroy virtual machines within the cloud. Client computers 411-414 may connect to management server 410 via the Internet or some other communication network, and may request access to one or more of the computing resources managed by management server 410. In response to client requests, the management server 410 may include a resource manager configured to select and provision physical resources in the hardware layer of the cloud system based on the client requests. For example, the management server 410 and additional components of the cloud system may be configured to provision, create, and manage virtual machines and their operating environments (e.g., hypervisors, storage resources, services offered by the network elements, etc.) for customers at client computers 411-414, over a network (e.g., the Internet), providing customers with computational resources, data storage services, networking capabilities, and computer platform and application support. Cloud systems also may be configured to provide various specific services, including security systems, development environments, user interfaces, and the like.

Certain clients 411-414 may be related, for example, to different client computers creating virtual machines on behalf of the same end user, or different users affiliated with the same company or organization. In other examples, certain clients 411-414 may be unrelated, such as users affiliated with different companies or organizations. For unrelated clients, information on the virtual machines or storage of any one user may be hidden from other users.

Referring now to the physical hardware layer of a cloud computing environment, availability zones 401-402 (or zones) may refer to a collocated set of physical computing resources. Zones may be geographically separated from other zones in the overall cloud of computing resources. For example, zone 401 may be a first cloud datacenter located in California, and zone 402 may be a second cloud datacenter located in Florida. Management server 410 may be located at one of the availability zones, or at a separate location. Each zone may include an internal network that interfaces with devices that are outside of the zone, such as the management server 410, through a gateway. End users of the cloud (e.g., clients 411-414) might or might not be aware of the distinctions between zones. For example, an end user may request the creation of a virtual machine having a specified amount of memory, processing power, and network capabilities. The management server 410 may respond to the user's request and may allocate the resources to create the virtual machine without the user knowing whether the virtual machine was created using resources from zone 401 or zone 402. In other examples, the cloud system may allow end users to request that virtual machines (or other cloud resources) are allocated in a specific zone or on specific resources 403-405 within a zone.

In this example, each zone 401-402 may include an arrangement of various physical hardware components (or computing resources) 403-405, for example, physical hosting resources (or processing resources), physical network resources, physical storage resources, switches, and additional hardware resources that may be used to provide cloud computing services to customers. The physical hosting resources in a cloud zone 401-402 may include one or more computer servers 403, such as the virtualization servers 301 described above, which may be configured to create and host virtual machine instances. The physical network resources in a cloud zone 401 or 402 may include one or more network elements 405 (e.g., network service providers) comprising hardware and/or software configured to provide a network service to cloud customers, such as firewalls, network address translators, load balancers, virtual private network (VPN) gateways, Dynamic Host Configuration Protocol (DHCP) routers, and the like. The storage resources in the cloud zone 401-402 may include storage disks (e.g., solid state drives (SSDs), magnetic hard disks, etc.) and other storage devices.

The example cloud computing environment shown in FIG. 4 also may include a virtualization layer (e.g., as shown in FIGS. 1-3) with additional hardware and/or software resources configured to create and manage virtual machines and provide other services to customers using the physical resources in the cloud. The virtualization layer may include hypervisors, as described above in FIG. 3, along with other components to provide network virtualizations, storage virtualizations, etc. The virtualization layer may be as a separate layer from the physical resource layer, or may share some or all of the same hardware and/or software resources with the physical resource layer. For example, the virtualization layer may include a hypervisor installed in each of the virtualization servers 403 with the physical computing resources. Known cloud systems may alternatively be used, e.g., WINDOWS AZURE (Microsoft Corporation of Redmond Wash.), AMAZON EC2 (Amazon.com Inc. of Seattle, Wash.), IBM BLUE CLOUD (IBM Corporation of Armonk, N.Y.), or others.

Enterprise Mobility Management Architecture

Figure 5:
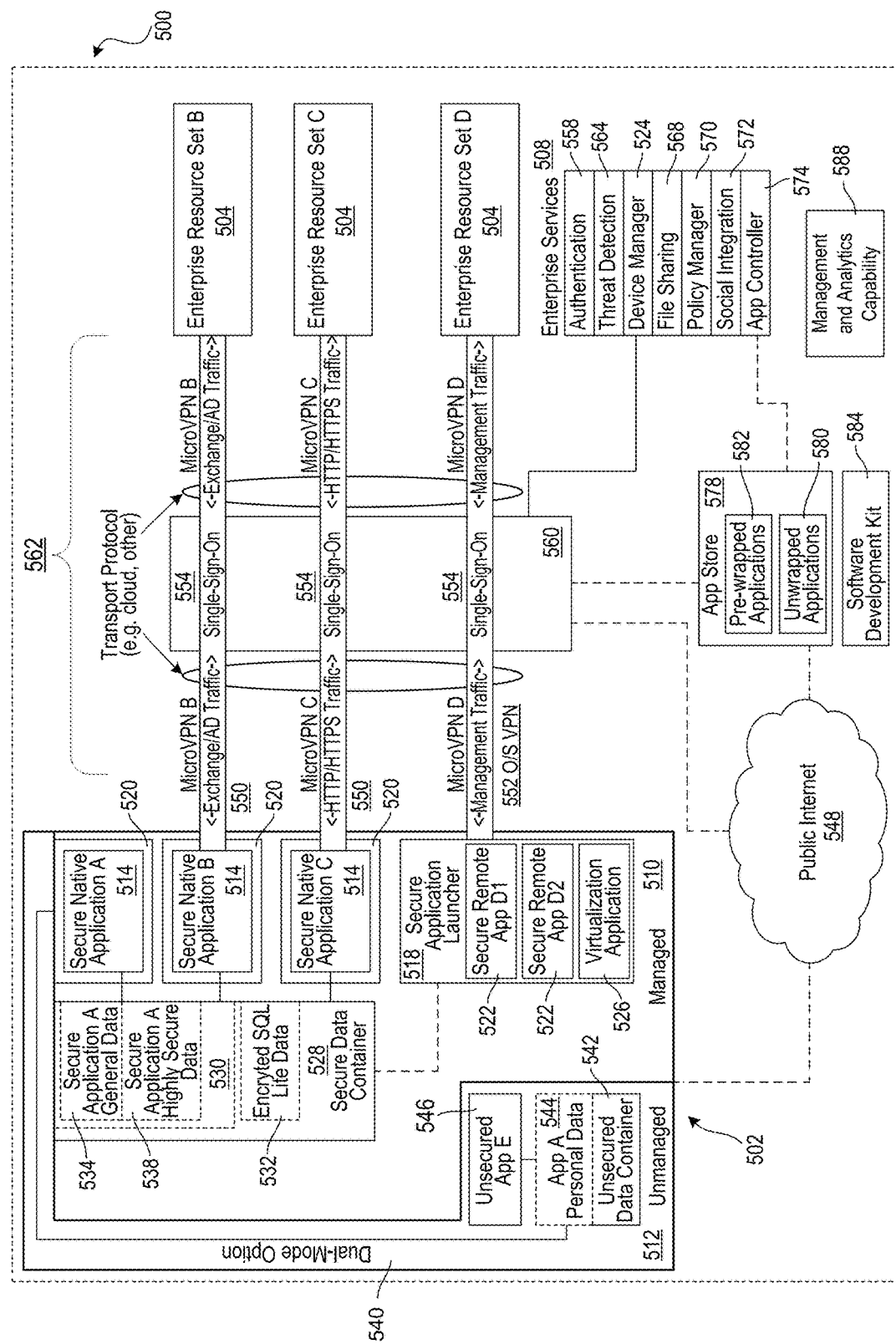
FIG. 5 depicts an illustrative enterprise mobility management system.

FIG. 5 represents an enterprise mobility technical architecture 500 for use in a "Bring Your Own Device" (BYOD) environment. The architecture enables a user of a mobile device 502 to both access enterprise or personal resources from a mobile device 502 and use the mobile device 502 for personal use. The user may access such enterprise resources 504 or enterprise services 508 using a mobile device 502 that is purchased by the user or a mobile device 502 that is provided by the enterprise to the user. The user may utilize the mobile device 502 for business use only or for business and personal use. The mobile device 502 may run an iOS operating system, an Android operating system, or the like. The enterprise may choose to implement policies to manage the mobile device 502. The policies may be implemented through a firewall or gateway in such a way that the mobile device 502 may be identified, secured or security verified, and provided selective or full access to the enterprise resources (e.g., 504 and 508.) The policies may be mobile device management policies, mobile application management policies, mobile data management policies, or some combination of mobile device, application, and data management policies. A mobile device 502 that is managed through the application of mobile device management policies may be referred to as an enrolled device.

In some embodiments, the operating system of the mobile device 502 may be separated into a managed partition 510 and an unmanaged partition 512. The managed partition 510 may have policies applied to it to secure the applications running on and data stored in the managed partition 510. The applications running on the managed partition 510 may be secure applications. In other embodiments, all applications may execute in accordance with a set of one or more policy files received separate from the application, and which define one or more security parameters, features, resource restrictions, and/or other access controls that are enforced by the mobile device management system when that application is executing on the mobile device 502. By operating in accordance with their respective policy file(s), each application may be allowed or restricted from communications with one or more other applications and/or resources, thereby creating a virtual partition. Thus, as used herein, a partition may refer to a physically partitioned portion of memory (physical partition), a logically partitioned portion of memory (logical partition), and/or a virtual partition created as a result of enforcement of one or more policies and/or policy files across multiple applications as described herein (virtual partition). Stated differently, by enforcing policies on managed applications, those applications may be restricted to only be able to communicate with other managed applications and trusted enterprise resources, thereby creating a virtual partition that is not accessible by unmanaged applications and devices.

The secure applications may be email applications, web browsing applications, software-as-a-service (SaaS) access applications, Windows Application access applications, and the like. The secure applications may be secure native applications 514, secure remote applications 522 executed by a secure application launcher 518, virtualization applications 526 executed by a secure application launcher 518, and the like. The secure native applications 514 may be wrapped by a secure application wrapper 520. The secure application wrapper 520 may include integrated policies that are executed on the mobile device 502 when the secure native application 514 is executed on the mobile device 502. The secure application wrapper 520 may include meta-data that points the secure native application 514 running on the mobile device 502 to the resources hosted at the enterprise (e.g., 504 and 508) that the secure native application 514 may require to complete the task requested upon execution of the secure native application 514. The secure remote applications 522 executed by a secure application launcher 518 may be executed within the secure application launcher 518. The virtualization applications 526 executed by a secure application launcher 518 may utilize resources on the mobile device 502, at the enterprise resources 504, and the like. The resources used on the mobile device 502 by the virtualization applications 526 executed by a secure application launcher 518 may include user interaction resources, processing resources, and the like. The user interaction resources may be used to collect and transmit keyboard input, mouse input, camera input, tactile input, audio input, visual input, gesture input, and the like. The processing resources may be used to present a user interface, process data received from the enterprise resources 504, and the like. The resources used at the enterprise resources 504 by the virtualization applications 526 executed by a secure application launcher 518 may include user interface generation resources, processing resources, and the like. The user interface generation resources may be used to assemble a user interface, modify a user interface, refresh a user interface, and the like. The processing resources may be used to create information, read information, update information, delete information, and the like. For example, the virtualization application 526 may record user interactions associated with a graphical user interface (GUI) and communicate them to a server application where the server application will use the user interaction data as an input to the application operating on the server. In such an arrangement, an enterprise may elect to maintain the application on the server side as well as data, files, etc. associated with the application. While an enterprise may elect to "mobilize" some applications in accordance with the principles herein by securing them for deployment on the mobile device 502, this arrangement may also be elected for certain applications. For example, while some applications may be secured for use on the mobile device 502, others might not be prepared or appropriate for deployment on the mobile device 502 so the enterprise may elect to provide the mobile user access to the unprepared applications through virtualization techniques. As another example, the enterprise may have large complex applications with large and complex data sets (e.g., material resource planning applications) where it would be very difficult, or otherwise undesirable, to customize the application for the mobile device 502 so the enterprise may elect to provide access to the application through virtualization techniques. As yet another example, the enterprise may have an application that maintains highly secured data (e.g., human resources data, customer data, engineering data) that may be deemed by the enterprise as too sensitive for even the secured mobile environment so the enterprise may elect to use virtualization techniques to permit mobile access to such applications and data. An enterprise may elect to provide both fully secured and fully functional applications on the mobile device 502 as well as a virtualization application 526 to allow access to applications that are deemed more properly operated on the server side. In an embodiment, the virtualization application 526 may store some data, files, etc. on the mobile device 502 in one of the secure storage locations. An enterprise, for example, may elect to allow certain information to be stored on the mobile device 502 while not permitting other information.

In connection with the virtualization application 526, as described herein, the mobile device 502 may have a virtualization application 526 that is designed to present GUIs and then record user interactions with the GUI. The virtualization application 526 may communicate the user interactions to the server side to be used by the server side application as user interactions with the application. In response, the application on the server side may transmit back to the mobile device 502 a new GUI. For example, the new GUI may be a static page, a dynamic page, an animation, or the like, thereby providing access to remotely located resources.

The secure applications 514 may access data stored in a secure data container 528 in the managed partition 510 of the mobile device 502. The data secured in the secure data container may be accessed by the secure native applications 514, secure remote applications 522 executed by a secure application launcher 518, virtualization applications 526 executed by a secure application launcher 518, and the like. The data stored in the secure data container 528 may include files, databases, and the like. The data stored in the secure data container 528 may include data restricted to a specific secure application 530, shared among secure applications 532, and the like. Data restricted to a secure application may include secure general data 534 and highly secure data 538. Secure general data may use a strong form of encryption such as Advanced Encryption Standard (AES) 128-bit encryption or the like, while highly secure data 538 may use a very strong form of encryption such as AES 256-bit encryption. Data stored in the secure data container 528 may be deleted from the mobile device 502 upon receipt of a command from the device manager 524. The secure applications (e.g., 514, 522, and 526) may have a dual-mode option 540. The dual mode option 540 may present the user with an option to operate the secured application in an unsecured or unmanaged mode. In an unsecured or unmanaged mode, the secure applications may access data stored in an unsecured data container 542 on the unmanaged partition 512 of the mobile device 502. The data stored in an unsecured data container may be personal data 544. The data stored in an unsecured data container 542 may also be accessed by unsecured applications 546 that are running on the unmanaged partition 512 of the mobile device 502. The data stored in an unsecured data container 542 may remain on the mobile device 502 when the data stored in the secure data container 528 is deleted from the mobile device 502. An enterprise may want to delete from the mobile device 502 selected or all data, files, and/or applications owned, licensed or controlled by the enterprise (enterprise data) while leaving or otherwise preserving personal data, files, and/or applications owned, licensed or controlled by the user (personal data). This operation may be referred to as a selective wipe. With the enterprise and personal data arranged in accordance to the aspects described herein, an enterprise may perform a selective wipe.

The mobile device 502 may connect to enterprise resources 504 and enterprise services 508 at an enterprise, to the public Internet 548, and the like. The mobile device 502 may connect to enterprise resources 504 and enterprise services 508 through virtual private network connections. The virtual private network connections, also referred to as microVPN or application-specific VPN, may be specific to particular applications (as illustrated by microVPNs 550, particular devices, particular secured areas on the mobile device (as illustrated by O/S VPN 552), and the like. For example, each of the wrapped applications in the secured area of the mobile device 502 may access enterprise resources through an application specific VPN such that access to the VPN would be granted based on attributes associated with the application, possibly in conjunction with user or device attribute information. The virtual private network connections may carry Microsoft Exchange traffic, Microsoft Active Directory traffic, HyperText Transfer Protocol (HTTP) traffic, HyperText Transfer Protocol Secure (HTTPS) traffic, application management traffic, and the like. The virtual private network connections may support and enable single-sign-on authentication processes 554. The single-sign-on processes may allow a user to provide a single set of authentication credentials, which are then verified by an authentication service 558. The authentication service 558 may then grant to the user access to multiple enterprise resources 504, without requiring the user to provide authentication credentials to each individual enterprise resource 504.

The virtual private network connections may be established and managed by an access gateway 560. The access gateway 560 may include performance enhancement features that manage, accelerate, and improve the delivery of enterprise resources 504 to the mobile device 502. The access gateway 560 may also re-route traffic from the mobile device 502 to the public Internet 548, enabling the mobile device 502 to access publicly available and unsecured applications that run on the public Internet 548. The mobile device 502 may connect to the access gateway 560 via a transport protocol or network 562. The transport network 562 may use one or more transport protocols and may be a wired network, wireless network, cloud network, local area network, metropolitan area network, wide area network, public network, private network, and the like.

The enterprise resources 504 may include email servers, file sharing servers, SaaS applications, Web application servers, Windows application servers, and the like. Email servers may include Exchange servers, Lotus Notes servers, and the like. File sharing servers may include ShareFile servers, and the like. SaaS applications may include Salesforce, and the like. Windows application servers may include any application server that is built to provide applications that are intended to run on a local Windows operating system, and the like. The enterprise resources 504 may be premise-based resources, cloud-based resources, and the like. The enterprise resources 504 may be accessed by the mobile device 502 directly or through the access gateway 560. The enterprise resources 504 may be accessed by the mobile device 502 via the transport network 562.

The enterprise services 508 may include authentication services 558, threat detection services 564, device manager services 524, file sharing services 568, policy manager services 570, social integration services 572, application controller services 574, and the like. Authentication services 558 may include user authentication services, device authentication services, application authentication services, data authentication services, and the like. Authentication services 558 may use certificates. The certificates may be stored on the mobile device 502, by the enterprise resources 504, and the like. The certificates stored on the mobile device 502 may be stored in an encrypted location on the mobile device 502, the certificate may be temporarily stored on the mobile device 502 for use at the time of authentication, and the like. Threat detection services 564 may include intrusion detection services, unauthorized access attempt detection services, and the like. Unauthorized access attempt detection services may include unauthorized attempts to access devices, applications, data, and the like. Device management services 524 may include configuration, provisioning, security, support, monitoring, reporting, and decommissioning services. File sharing services 568 may include file management services, file storage services, file collaboration services, and the like. Policy manager services 570 may include device policy manager services, application policy manager services, data policy manager services, and the like. Social integration services 572 may include contact integration services, collaboration services, integration with social networks such as Facebook, Twitter, and LinkedIn, and the like. Application controller services 574 may include management services, provisioning services, deployment services, assignment services, revocation services, wrapping services, and the like.

The enterprise mobility technical architecture 500 may include an application store 578. The application store 578 may include unwrapped applications 580, pre-wrapped applications 582, and the like. Applications may be populated in the application store 578 from the application controller 574. The application store 578 may be accessed by the mobile device 502 through the access gateway 560, through the public Internet 548, or the like. The application store 578 may be provided with an intuitive and easy to use user interface.

A software development kit 584 may provide a user the capability to secure applications selected by the user by wrapping the application as described previously in this description. An application that has been wrapped using the software development kit 584 may then be made available to the mobile device 502 by populating it in the application store 578 using the application controller 574.

The enterprise mobility technical architecture 500 may include a management and analytics capability 588. The management and analytics capability 588 may provide information related to how resources are used, how often resources are used, and the like. Resources may include devices, applications, data, and the like. How resources are used may include which devices download which applications, which applications access which data, and the like. How often resources are used may include how often an application has been downloaded, how many times a specific set of data has been accessed by an application, and the like.

Figure 6:
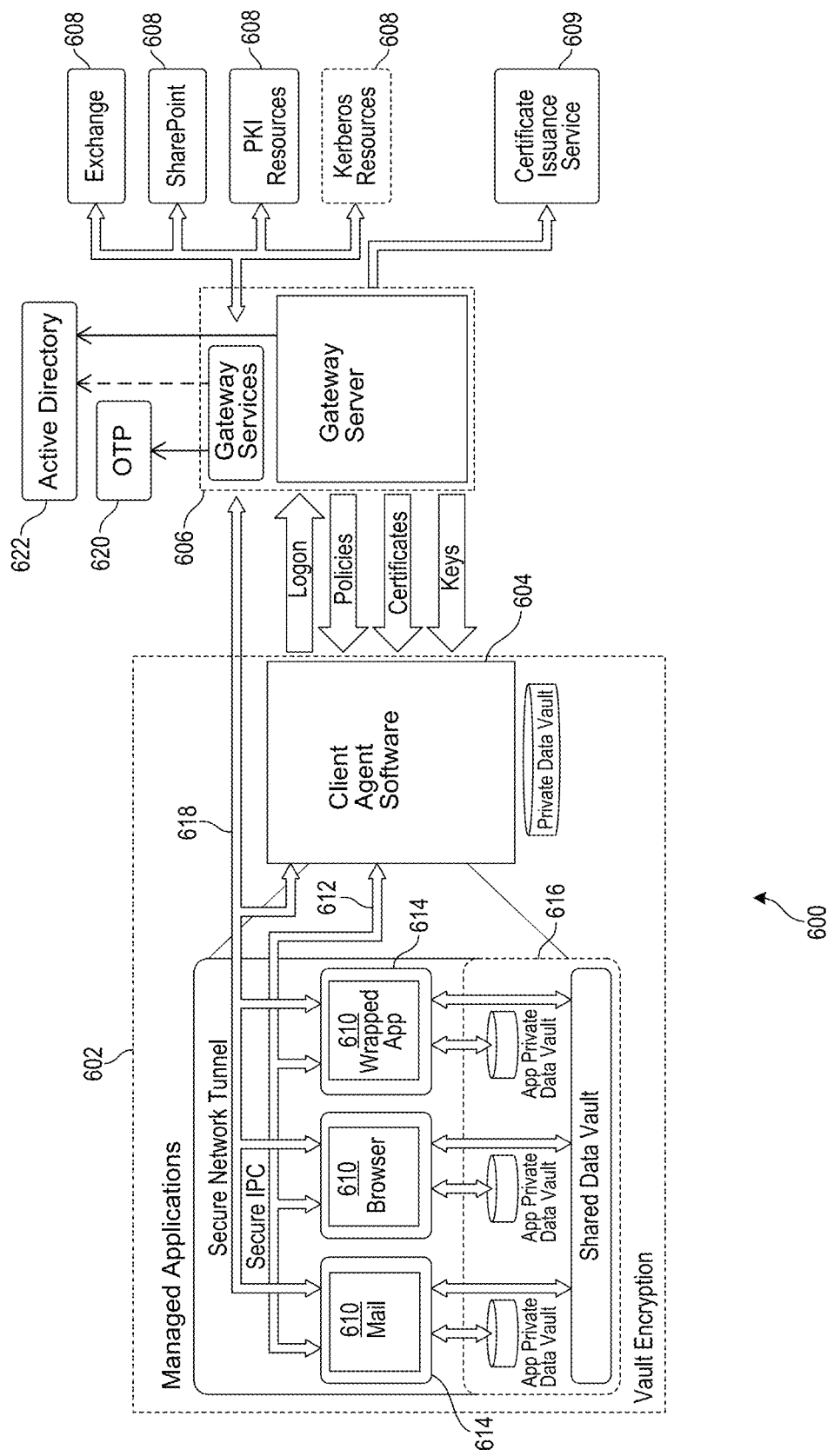
FIG. 6 depicts another illustrative enterprise mobility management system.

FIG. 6 is another illustrative enterprise mobility management system 600. Some of the components of the mobility management system 500 described above with reference to FIG. 5 have been omitted for the sake of simplicity. The architecture of the system 600 depicted in FIG. 6 is similar in many respects to the architecture of the system 500 described above with reference to FIG. 5 and may include additional features not mentioned above.

In this case, the left hand side represents an enrolled mobile device 602 with a client agent 604, which interacts with gateway server 606 (which includes Access Gateway and application controller functionality) to access various enterprise resources 608 and services 609 such as Exchange, Sharepoint, public-key infrastructure (PKI) Resources, Kerberos Resources, Certificate Issuance service, as shown on the right hand side above. Although not specifically shown, the mobile device 602 may also interact with an enterprise application store (StoreFront) for the selection and downloading of applications.

The client agent 604 acts as the UI (user interface) intermediary for Windows apps/desktops hosted in an Enterprise data center, which are accessed using the High-Definition User Experience (HDX)/ICA display remoting protocol. The client agent 604 also supports the installation and management of native applications on the mobile device 602, such as native iOS or Android applications. For example, the managed applications 610 (mail, browser, wrapped application) shown in the figure above are all native applications that execute locally on the mobile device 602. Client agent 604 and application management framework of this architecture act to provide policy driven management capabilities and features such as connectivity and SSO (single sign on) to enterprise resources/services 608. The client agent 604 handles primary user authentication to the enterprise, normally to Access Gateway (AG) 606 with SSO to other gateway server components. The client agent 604 obtains policies from gateway server 606 to control the behavior of the managed applications 610 on the mobile device 602.

The Secure InterProcess Communication (IPC) links 612 between the native applications 610 and client agent 604 represent a management channel, which may allow a client agent to supply policies to be enforced by the application management framework 614 "wrapping" each application. The IPC channel 612 may also allow client agent 604 to supply credential and authentication information that enables connectivity and SSO to enterprise resources 608. Finally, the IPC channel 612 may allow the application management framework 614 to invoke user interface functions implemented by client agent 604, such as online and offline authentication.

Communications between the client agent 604 and gateway server 606 are essentially an extension of the management channel from the application management framework 614 wrapping each native managed application 610. The application management framework 614 may request policy information from client agent 604, which in turn may request it from gateway server 606. The application management framework 614 may request authentication, and client agent 604 may log into the gateway services part of gateway server 606 (also known as NETSCALER ACCESS GATEWAY). Client agent 604 may also call supporting services on gateway server 606, which may produce input material to derive encryption keys for the local data vaults 616, or may provide client certificates which may enable direct authentication to PKI protected resources, as more fully explained below.

In more detail, the application management framework 614 "wraps" each managed application 610. This may be incorporated via an explicit build step, or via a post-build processing step. The application management framework 614 may "pair" with client agent 604 on first launch of an application 610 to initialize the Secure IPC channel 612 and obtain the policy for that application. The application management framework 614 may enforce relevant portions of the policy that apply locally, such as the client agent login dependencies and some of the containment policies that restrict how local OS services may be used, or how they may interact with the managed application 610.

The application management framework 614 may use services provided by client agent 604 over the Secure IPC channel 612 to facilitate authentication and internal network access. Key management for the private and shared data vaults 616 (containers) may be also managed by appropriate interactions between the managed applications 610 and client agent 604. Vaults 616 may be available only after online authentication, or may be made available after offline authentication if allowed by policy. First use of vaults 616 may require online authentication, and offline access may be limited to at most the policy refresh period before online authentication is again required.

Network access to internal resources may occur directly from individual managed applications 610 through Access Gateway 606. The application management framework 614 may be responsible for orchestrating the network access on behalf of each managed application 610. Client agent 604 may facilitate these network connections by providing suitable time limited secondary credentials obtained following online authentication. Multiple modes of network connection may be used, such as reverse web proxy connections and end-to-end VPN-style tunnels 618.

The Mail and Browser managed applications 610 have special status and may make use of facilities that might not be generally available to arbitrary wrapped applications. For example, the Mail application 610 may use a special background network access mechanism that allows it to access an Exchange server 608 over an extended period of time without requiring a full AG logon. The Browser application 610 may use multiple private data vaults 616 to segregate different kinds of data.

This architecture may support the incorporation of various other security features. For example, gateway server 606 (including its gateway services) in some cases may not need to validate active directory (AD) passwords. It can be left to the discretion of an enterprise whether an AD password may be used as an authentication factor for some users in some situations. Different authentication methods may be used if a user is online or offline (i.e., connected or not connected to a network).

Step up authentication is a feature wherein gateway server 606 may identify managed native applications 610 that are allowed to have access to highly classified data requiring strong authentication, and ensure that access to these applications is only permitted after performing appropriate authentication, even if this means a re-authentication is required by the user after a prior weaker level of login.

Another security feature of this solution is the encryption of the data vaults 616 (containers) on the mobile device 602. The vaults 616 may be encrypted so that all on-device data including files, databases, and configurations are protected. For on-line vaults, the keys may be stored on the server (gateway server 606), and for off-line vaults, a local copy of the keys may be protected by a user password or biometric validation. If or when data is stored locally on the mobile device 602 in the secure container 616, it may be preferred that a minimum of AES 256 encryption algorithm be utilized.

Other secure container features may also be implemented. For example, a logging feature may be included, wherein security events happening inside a managed application 610 may be logged and reported to the backend. Data wiping may be supported, such as if or when the managed application 610 detects tampering, associated encryption keys may be written over with random data, leaving no hint on the file system that user data was destroyed. Screenshot protection may be another feature, where an application may prevent any data from being stored in screenshots. For example, the key window's hidden property may be set to YES. This may cause whatever content is currently displayed on the screen to be hidden, resulting in a blank screenshot where any content would normally reside.

Local data transfer may be prevented, such as by preventing any data from being locally transferred outside the application container, e.g., by copying it or sending it to an external application. A keyboard cache feature may operate to disable the autocorrect functionality for sensitive text fields. SSL certificate validation may be operable so the application specifically validates the server SSL certificate instead of it being stored in the keychain. An encryption key generation feature may be used such that the key used to encrypt data on the mobile device 602 is generated using a passphrase or biometric data supplied by the user (if offline access is required). It may be XORed with another key randomly generated and stored on the server side if offline access is not required. Key Derivation functions may operate such that keys generated from the user password use KDFs (key derivation functions, notably Password-Based Key Derivation Function 2 (PBKDF2)) rather than creating a cryptographic hash of it. The latter makes a key susceptible to brute force or dictionary attacks.

Further, one or more initialization vectors may be used in encryption methods. An initialization vector will cause multiple copies of the same encrypted data to yield different cipher text output, preventing both replay and cryptanalytic attacks. This will also prevent an attacker from decrypting any data even with a stolen encryption key. Further, authentication then decryption may be used, wherein application data is decrypted only after the user has authenticated within the application. Another feature may relate to sensitive data in memory, which may be kept in memory (and not in disk) only when it's needed. For example, login credentials may be wiped from memory after login, and encryption keys and other data inside objective-C instance variables are not stored, as they may be easily referenced. Instead, memory may be manually allocated for these.

An inactivity timeout may be implemented, wherein after a policy-defined period of inactivity, a user session is terminated.

Data leakage from the application management framework 614 may be prevented in other ways. For example, if or when a managed application 610 is put in the background, the memory may be cleared after a predetermined (configurable) time period. When backgrounded, a snapshot may be taken of the last displayed screen of the application to fasten the foregrounding process. The screenshot may contain confidential data and hence should be cleared.

Another security feature may relate to the use of an OTP (one time password) 620 without the use of an AD (active directory) 622 password for access to one or more applications. In some cases, some users do not know (or are not permitted to know) their AD password, so these users may authenticate using an OTP 620 such as by using a hardware OTP system like SecurID (OTPs may be provided by different vendors also, such as Entrust or Gemalto). In some cases, after a user authenticates with a user ID, a text may be sent to the user with an OTP 620. In some cases, this may be implemented only for online use, with a prompt being a single field.

An offline password may be implemented for offline authentication for those managed applications 610 for which offline use is permitted via enterprise policy. For example, an enterprise may want StoreFront to be accessed in this manner In this case, the client agent 604 may require the user to set a custom offline password and the AD password is not used. Gateway server 606 may provide policies to control and enforce password standards with respect to the minimum length, character class composition, and age of passwords, such as described by the standard Windows Server password complexity requirements, although these requirements may be modified.

Another feature may relate to the enablement of a client side certificate for certain applications 610 as secondary credentials (for the purpose of accessing PKI protected web resources via the application management framework micro VPN feature). For example, a managed application 610 may utilize such a certificate. In this case, certificate-based authentication using ActiveSync protocol may be supported, wherein a certificate from the client agent 604 may be retrieved by gateway server 606 and used in a keychain. Each managed application 610 may have one associated client certificate, identified by a label that is defined in gateway server 606.

Gateway server 606 may interact with an enterprise special purpose web service to support the issuance of client certificates to allow relevant managed applications to authenticate to internal PKI protected resources.

The client agent 604 and the application management framework 614 may be enhanced to support obtaining and using client certificates for authentication to internal PKI protected network resources. More than one certificate may be supported, such as to match various levels of security and/or separation requirements. The certificates may be used by the Mail and Browser managed applications 610, and ultimately by arbitrary wrapped applications 610 (provided those applications use web service style communication patterns where it is reasonable for the application management framework to mediate HTTPS requests).

Application management client certificate support on iOS may rely on importing a public-key cryptography standards (PKCS) 12 BLOB (Binary Large Object) into the iOS keychain in each managed application 610 for each period of use. Application management framework client certificate support may use a HTTPS implementation with private in-memory key storage. The client certificate may not be present in the iOS keychain and may not be persisted except potentially in "online-only" data value that is strongly protected.

Mutual SSL or TLS may also be implemented to provide additional security by requiring that a mobile device 602 is authenticated to the enterprise, and vice versa. Virtual smart cards for authentication to gateway server 606 may also be implemented.

Both limited and full Kerberos support may be additional features. The full support feature relates to an ability to do full Kerberos login to Active Directory (AD) 622, using an AD password or trusted client certificate, and obtain Kerberos service tickets to respond to HTTP Negotiate authentication challenges. The limited support feature relates to constrained delegation in Citrix Access Gateway Enterprise Edition (AGEE), where AGEE supports invoking Kerberos protocol transition so it can obtain and use Kerberos service tickets (subject to constrained delegation) in response to HTTP Negotiate authentication challenges. This mechanism works in reverse web proxy (aka corporate virtual private network (CVPN)) mode, and when HTTP (but not HTTPS) connections are proxied in VPN and MicroVPN mode.

Another feature may relate to application container locking and wiping, which may automatically occur upon jailbreak or rooting detections, and occur as a pushed command from administration console, and may include a remote wipe functionality even when a managed application 610 is not running.

A multi-site architecture or configuration of enterprise application store and an application controller may be supported that allows users to be serviced from one of several different locations in case of failure.

In some cases, managed applications 610 may be allowed to access a certificate and private key via an API (for example, OpenSSL). Trusted managed applications 610 of an enterprise may be allowed to perform specific Public Key operations with an application's client certificate and private key. Various use cases may be identified and treated accordingly, such as if or when an application behaves like a browser and no certificate access is required, if or when an application reads a certificate for "who am I," if or when an application uses the certificate to build a secure session token, and if or when an application uses private keys for digital signing of important data (e.g. transaction log) or for temporary data encryption.

Real Time Digital Content Concealment

Figure 7:
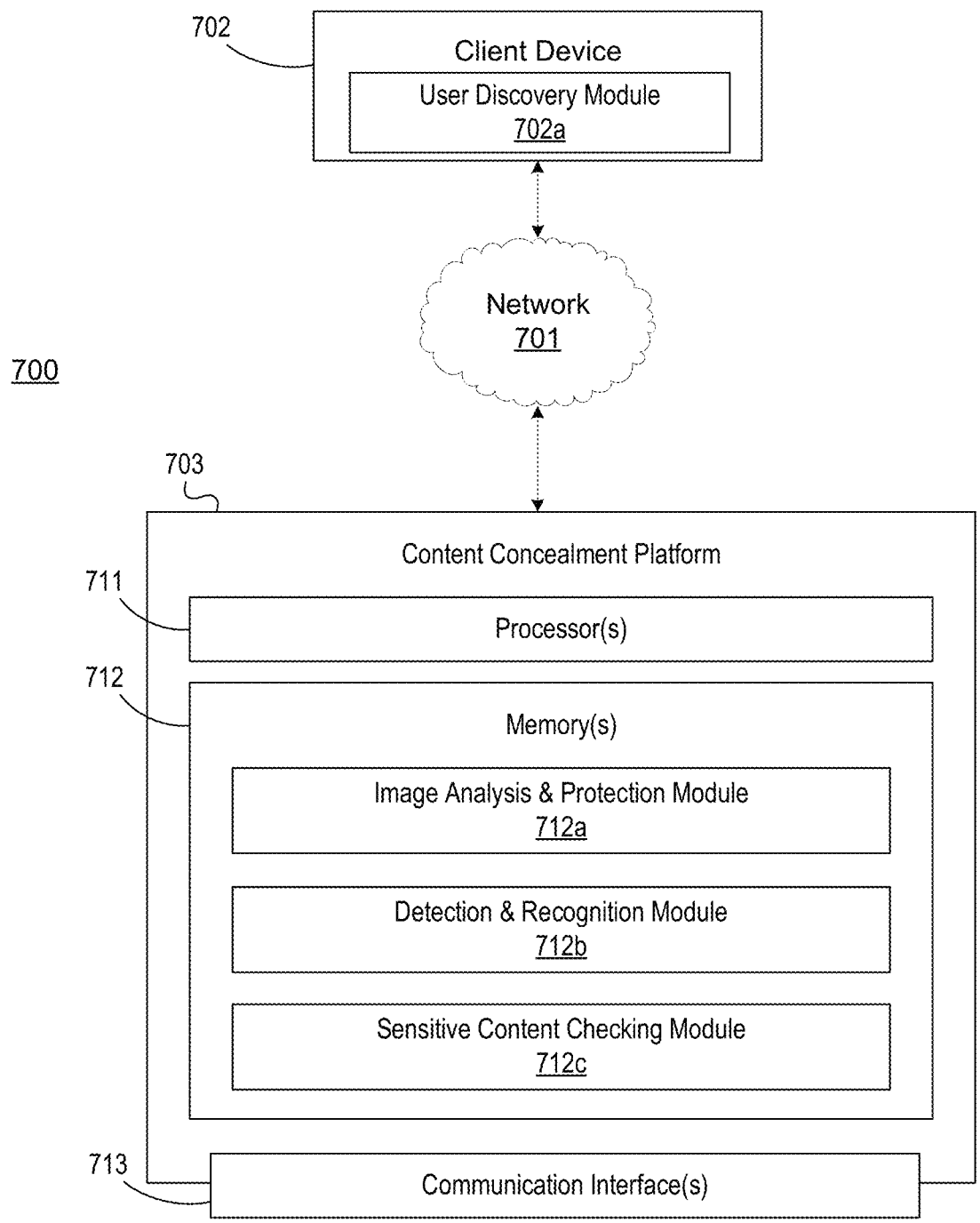
FIG. 7 depicts an illustrative computing environment for performing real time digital content concealment in accordance with one or more example embodiments.

FIG. 7 depicts an illustrative computing environment configured to perform real time digital content concealment based on viewers of the content (e.g., user groups) in accordance with one or more example embodiments. Referring to FIG. 7, computing environment 700 may include one or more computer systems. For example, computing environment 700 may include a client device 702 and a content concealment platform 703.

Client device 702 may be a computing device (e.g., smart phone, tablet computer, laptop computer, television, desktop computer, or the like) that may be used to display content. For example, the client device 702 may be used by an employee of an institution to present or otherwise display confidential information that only other employees or a particular group of the employees of the institution should have access to. Additionally or alternatively, the client device 702 may be used by an individual to display content that may contain text that might not suitable for particular groups of individuals due to other characteristics (e.g., age, or the like). In one or more instances, the client device 702 may include a user discovery module 702a that may be configured to perform facial detection and recognition, aggregate users by groups, and detect changes in present groups. In one or more instances, the user discovery module 702a may part of software installed at the client device 702 (e.g., a remote desktop application, or the like). In one or more instances, the client device 702 may include a communication interface that may configure the client device 702 to communicate with one or more other computing devices, such as the content concealment platform 703. In one or more instances, the communication interface may be a hardware component such as a network interface configured to support communication between the client device 102 and one or more networks (e.g., network 701, or the like).

As illustrated in greater detail below, content concealment platform 703 may be a computer system that includes one or more computing devices and/or other computer components (e.g., processors, memories, communication interfaces). In one or more instances, content concealment platform 703 may correspond to one or more servers configured to perform image analysis and protection, text or image detection and recognition, and sensitive words/images checking in response to determination of a change in present user groups and/or content.

Content concealment platform 703 may include one or more processors 711, memory 712, and communication interface 713. A data bus may interconnect processor 711, memory 712, and communication interface 713. Communication interface 713 may be a network interface configured to support communication between the content concealment platform 703 and one or more networks (e.g., network 701, or the like). Memory 712 may include one or more program modules having instructions that when executed by processor 711 cause content concealment platform 703 to perform one or more functions described herein and/or access one or more databases that may store and/or otherwise maintain information which may be used by such program modules and/or processor 711. In some instances, the one or more program modules and/or databases may be stored by and/or maintained in different memory units of content concealment platform 703 and/or by different computing devices that may form and/or otherwise make up content concealment platform 703. For example, memory 712 may have, host, store, and/or include image analysis and protection module 712a, detection and recognition module 712b, and sensitive content checking module 712c. Image analysis and protection module 712a may have instructions that direct and/or cause content concealment platform 703 to execute advanced techniques for image analysis and protection (e.g., by building an image layout by text type, detecting position/content changes in the image layout, and concealing text accordingly), as discussed in greater detail below. In one or more instances, image analysis and protection module 712a may be responsible for concealment of on-screen regions based on output of the detection and recognition module 712b in situations where a user arrival/leave event and/or a surface content update event occurs. In one or more instances, the surface content update event may correspond to a change in visible content being output for display. Detection and recognition module 712b may have instructions that direct and/or cause content concealment platform 703 execute advanced techniques for text/image detection and recognition (e.g., performing a particular method of text detection and recognition based on a text type and generating proposed text areas in the image layout). Sensitive content checking module 712c may have instructions that direct and/or cause content concealment platform 703 to execute advance techniques to determine whether content contains words or images that should be concealed (e.g., identifying words or images to conceal based on group rules, calculating positions for the words or images to conceal, and notifying the image analysis and protection module 712a that the words or images should be concealed).

Computing environment 700 may also include one or more networks, which may interconnect client device 702 and content concealment platform 703. For example, computing environment 700 may include a network 701 (which may e.g., interconnect client device 702 and content concealment platform 703). In one or more instances, the network 701 may be an internal network, an external network, a secure network, a public network, a hard-wired network, a wireless network, or the like.

In one or more arrangements, client device 702, content concealment platform 703, and/or the other systems included in computing environment 700 may be any type of computing device capable of receiving a user interface (e.g., browser interface, virtual desktop interface, streaming content, or the like), receiving input via the user interface, and communicating the received input to one or more other computing devices. For example, client device 702, content concealment platform 703, and/or the other systems included in computing environment 700 may in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of client device 702 and content concealment platform 703 may, in some instances, be special purpose computing devices configured to perform specific functions.

To further illustrate the computing environment 700, as an example of the component described above, an employee (e.g., a manager with certain security privileges) of an institution may be working at a desktop computer (e.g., client device 702) using confidential information. Another employee (e.g., an intern without the security privileges) may walk into the office to ask the manager a question. In this instance, the digital content displayed at the client device 702 (e.g., which may be related to the confidential information) should be concealed from the intern. Accordingly, the content concealment platform 703 may be used to conceal any confidential information/images from the client device 702 so that they are not viewed by the intern.

Figure 8A:
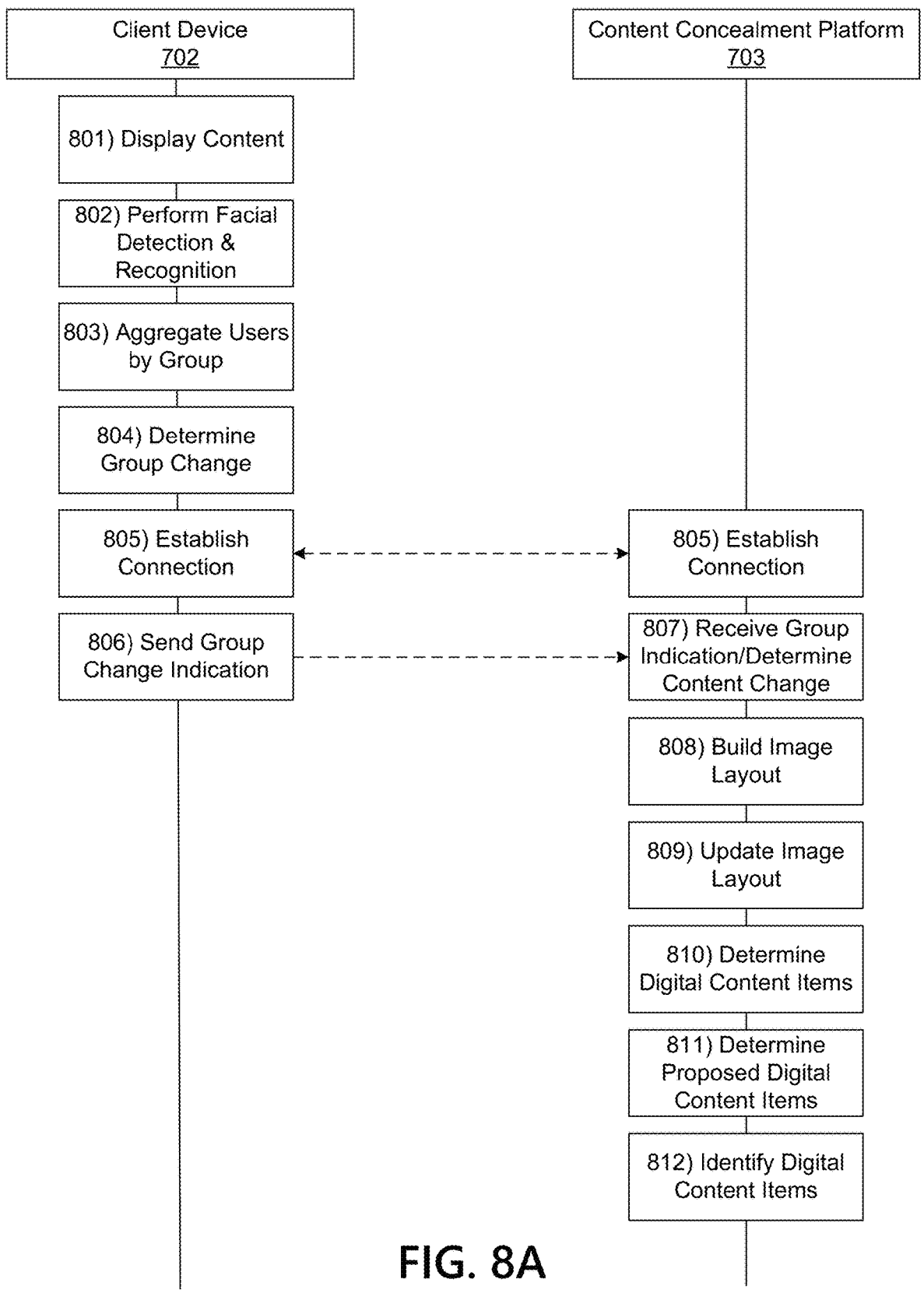
FIGS. 8A-8B depict an illustrative event sequence for performing real time digital content concealment in accordance with one or more example embodiments.
Figure 8B:
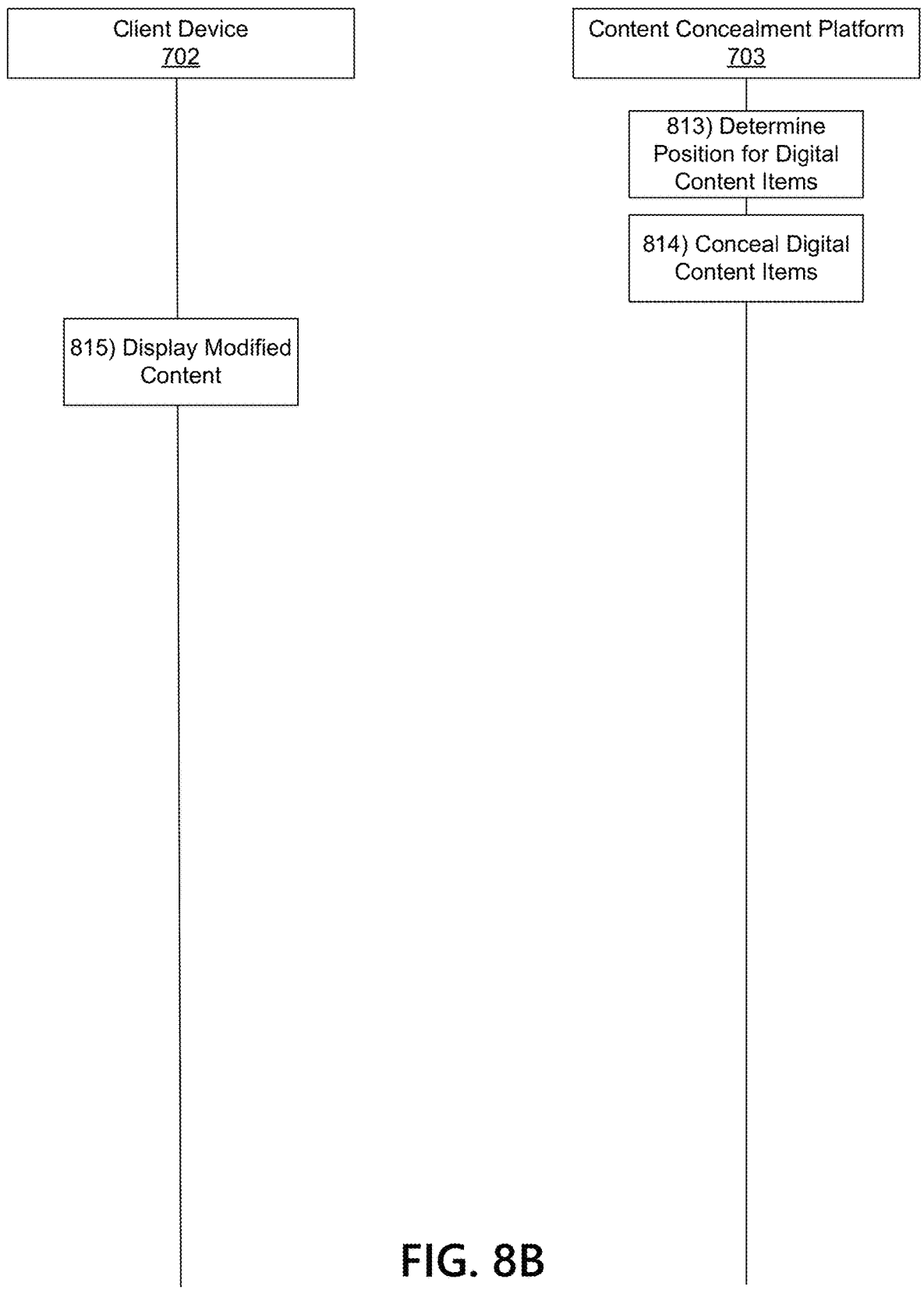
Figure 11A:
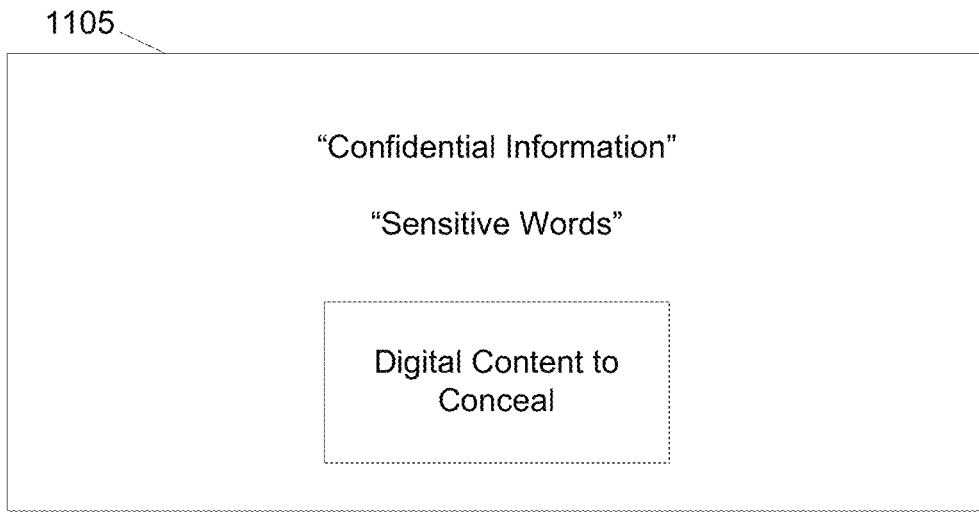
FIGS. 11A-11B depict graphical user interfaces associated with performance of real time text/digital content concealment in accordance with one or more example embodiments.

FIGS. 8A-8B depict an illustrative event sequence for deploying an enhanced processing system that performs real time digital content concealment in accordance with one or more example embodiments. For convenience, steps 801-815 are shown across FIGS. 8A-8B. However, it should be understood that steps 801-815 represent a single event sequence (e.g., step 813 in FIG. 8B may follow step 812 in FIG. 8A). Referring to FIG. 8A, at step 801, the client device 702 may display content. In one or more instances, in displaying the content, the client device 702 may display content specific to a particular institution and/or a particular group of employees within the institution. Accordingly, the content may contain text or other information that should be displayed to certain individuals and concealed from others. Additionally or alternatively, in displaying the content, the client device 702 may display content that contains text, images, or other information that may be appropriate for individuals above a predetermined age threshold and inappropriate for individuals below the predetermined age threshold. Accordingly, the content may similarly contain information that should be displayed to certain individuals but concealed from others. For example, in displaying the content, the client device 702 may display a graphical user interface similar to graphical user interface 1105, which is shown in FIG. 11A. In this example, in displaying graphical user interface 1105, the client device 702 may display confidential information, sensitive words (e.g., explicit language, or the like), or other text, images (e.g., a check with account information, explicit content, or the like), or content that should be displayed to some individuals but concealed from others.

In one or more instances, in displaying the content (e.g., documents, multi-media content, graphical user interfaces, applications, or the like), the client device 702 may display plain text, scene text (e.g., text embedded in an image), video text, or the like. In one or more instances where plain text or scene text are displayed, the content may be static content. In one or more instances where video text is displayed, the content may be dynamic content. In some instances, the content may contain a combination of these various text types.

At step 802, to determine whether or not portions of the content should be concealed, the client device 702 may perform facial detection and recognition. In one or more instances, the client device 702 may perform facial detection and recognition using the user discovery module 702a (as described above) embedded in the client device 702. In some instances, the user discovery module 702a may be integrated into a remote desktop application installed at the client device 702.

In some instances, the client device 702 may capture an image or video content corresponding to individuals within a predetermined proximity of the client device 702. In one or more instances, a dynamic proximity may be used that is adjusted based on information received by the client device 702 (e.g., room dimensions, room layout, or the like). In these instances, the client device 702 may capture the image or video content corresponding to individuals capable of viewing the content being displayed by the client device 702. In one or more instances, the client device 702 may perform facial detection on the image to determine locations and sizes of faces corresponding to present individuals. In addition, the client device 702 may implement a facial recognition algorithm to determine individuals associated with the faces. In performing facial recognition, the client device 702 may compare the captured image with an image of a user to authenticate the user (e.g., perform a one to one comparison for authentication). Additionally or alternatively, the client device 702 may compare the image with a plurality of facial images in a stored facial recognition database. In one or more instances, the stored facial recognition database may be a means for storing and maintaining facial recognition data (e.g., images, facial recognition scores, confidence measures, or the like). In one or more instances, the facial recognition database may be maintained remotely at the content concealment platform 703 or another computing platform (e.g., one or more external servers). Additionally or alternatively, the facial recognition database may be maintained locally at the client device 702.

In one or more instances, the client device 702 may identify an individual based on a determination that the image has a matching correlation with one of the plurality of stored facial images that exceeds a predetermined correlation threshold (e.g., perform a one to N comparison for authentication, where N is a number of stored facial images). Accordingly, the client device 702 may perform identification/facial recognition of the individuals. In some instances, individuals likely to be within a predetermined proximity of the client device 702 (e.g., capable of viewing the content) may initially provide the client device 702 with an identification image that may be stored and later used for identification/facial recognition comparisons. For example, all employees of an institution, members of a family, or other groups may initially take pictures of themselves using the client device 702.

In one or more instances, the client device 702 may implement a light weight face recognition technique using local binary patterns (LBP) to track movement of faces within view of a camera of the client device 702 (e.g. a webcam mounted on a monitor). In these instances, if an existing individual (e.g., a previously recognized individual) does not leave the camera view, it might not be necessary to request a full user identification again merely because the individual moved. Accordingly, by tracking the movement, and due to the small number of faces in front of the client device 702, real time facial recognition may be achieved. This may make the process of facial recognition more efficient in terms of both time and computational resources. If, however, a new individual arrives in front of the client device 702, the client device 702 may implement a principle component analysis (PCA) algorithm. In implementing the PCA algorithm, the client device 702 may be caused to access a local cache that stores faces buffered during a time period (e.g., the last twenty four hours). If the client device 702 is unable to determine a match between the new individual and one of the faces from the local cache, the full facial recognition algorithms as described above may be run to compare the new individual's face against the full set of images in the facial recognition database. In doing so, the client device 702 may more efficiently identify individuals who were recently already identified.

At step 803, after performing facial detection and recognition, the client device 702 may aggregate the individuals by groups as defined in a stored access role group database to build an active group list. In one or more instances, the access role group database may be maintained by a computing device separate from the client device 702, and the client device 702 may establish connections to the access role group database and communication accordingly. In some instances, the access role group database may include correlations of individuals to groups. For example, each individual may have a user identifier (e.g., a username, employee number, or the like that may identify a single user) and each group may correspond to a group identifier (e.g., an employee title, a security level, an age group, or the like that may identify one or more users who share particular characteristics). In these instances, the group identifier for a particular group may be assigned to an individual. In some instances, individuals may be assigned to multiple groups. Each group may have different rules for concealing text or other content. As an example, a cell phone number may be concealed from individuals in "Group A," whereas cell phone numbers may be visible to individuals in "Group B," but home addresses corresponding to the cell phone numbers may be concealed. In some instances, the groups may be defined based on employment status, job title, sub groups within a company, age, or the like.

At step 804, the client device 702 may determine whether a group change has occurred. In some instances, after aggregating the users by group, the client device 702 may determine that an individual corresponds to a group that was not previously present within view of a camera or other image capture device of the client device. Additionally or alternatively, after aggregating the users by group, the client device 702 may determine that a previously represented group is no longer represented (e.g., no individuals from that group remain present at the client device 702). In one or more instances, the client device 702 may monitor for group changes at a predetermined interval.

In one or more instances, the client device 702 may maintain an active group list that includes group nodes corresponding to each group and an indication of present individuals in each group. For example, in maintaining the active group list, the client device 702 may maintain a list of individuals who are in front of the camera of the client device 702. Additionally or alternatively, in maintaining the active group list, the client device 702 may maintain a list of individuals who are participating in an online meeting and sharing images/video through webcams. By applying the active group list concept to online meeting software, the client device 702 may increase security and prevent loss of confidential information during screen sharing of virtual meetings. In one or more instances, the client device 702 may update the active group list in response to arrival or departure of any individual. To further illustrate, several examples are described below.

In a first example, there may be four individuals within the camera view of the client device 702 and the client device 702 may build the following active group list: Group A—User 1, User 13; Group B—User 2; Group D—User 7. In one or more instances, the client device 702 may cache facial vectors built by the PCA algorithm at step 802 for Users 1, 13, 2, and 7. Additionally, the client device 702 may maintain similar facial feature vectors built by the LBP algorithms in memory to allow fast track analysis of movement in the camera view. In this example, none of the individuals leave or arrive, although some of the present individuals may move into camera view. Accordingly, in this example, the client device 702 might not modify the active group list, the PCA cache, or the LBP memory.

In a second example, the same facts from the above example apply, however, a new user 5 from group A may arrive into camera view. In response, the client device 702 may update the active group list as follows: Group A—User 1, User 13, User 5; Group B—User 2; Group D—User 7. Similarly, the client device 702 may update the LBP memory to include User 5 for later motion tracking. Additionally, the client device 702 may retrieve group information for User 5 from the PCA cache if possible. Otherwise, the client device 702 may retrieve group information from the full facial recognition database.

In yet a third example, building on the facts from example two above, User 7 and User 13 may leave the camera view. In this example, the client device 702 may make the following changes to the active group list, LBP memory, and PCA cache. First, the client device 702 may remove group D from the active group list because User 7 was the only present individual in that group. In addition, client device 702 may detach User 13 from the Group A node (e.g., remove User 13 from the list of users within the camera view who are associated with Group A). Accordingly, the active group list in this third example may be as follows: Group A—User 1, User 5; Group B—User 2. In one or more instances, the client device 702 may move group D to an inactive group list that may resemble: Group D—User 7. In addition, the client device 702 may delete User 7 and User 13 from LBP memory, but maintain them in the PCA cache for subsequent expedited access if they return to the camera view within a predetermined period (e.g., twenty four hours).

In yet a fourth example, building now on the facts from example three, Users 3 and 6 may arrive in the camera view, and may belong to a Group C. In this example, the client device 702 may add User 3 and User 6 to the active group list, which may result in the following active group list: Group A—User 1, User 5; Group B—User 2; Group C—User 3, User 6. In addition to adding User 3 and User 6 to the active group list, the client device 702 may add their information into the LBP memory and the PCA cache.

Accordingly, these examples illustrate that in some instances, there may be a change in the groups maintained in the active group list. In these instances, the client device 702 may proceed to step 805 to establish a connection with content concealment platform 703. In other instances, there might not be a change in the groups maintained in the active group list. In these instances, the client device 702 may continue to monitor for group changes until one is determined.

At step 805, the client device 702 may establish a connection with the content concealment platform 703. In one or more instances, the client device 702 may establish a wireless data connection with the content concealment platform 703 to link the client device 702 to the content concealment platform 703. Alternatively, the client device 702 may establish a wired data connection with the content concealment platform 703 to link the client device 702 to the content concealment platform 703. In one or more instances, once the client device 702 initially establishes a connection with the content concealment platform 703, this step might not be repeated.

At step 806, if the client device 702 determined, at step 804, that there was a change in the active group list, the client device 702 may generate an indication of the group change and may send the indication of the group change to the content concealment platform 703. For instance, in examples one and two as described above at step 804, because there is no group level change in the active group list, the client device 702 might not generate or send a notification to the content concealment platform 703 because additional semantic analysis might not be needed. In contrast, in examples three and four described above at step 804, because a user group drops and a user group is added, respectively, in these examples, the client device 702 may generate and send an indication of the group change to the content concealment platform 703 for purposes of having additional semantic analysis performed on the updated active group list. In one or more instances, in performing the additional semantic analysis, the client device 702 may determine whether additional or less concealment should be applied to the displayed content based on the group change. This additional semantic analysis is described below with regard to steps 808-814. In one or more instances, the client device 702 may send the indication of the group change to the content concealment platform 703 while the wireless data connection is established.

At step 807, the content concealment platform 703 may receive the indication of the group change from the client device 702. In receiving the indication, the content concealment platform 703 may receive a text message, a multimedia message, an alert/notification message, or the like. In one or more instances, the content concealment platform 703 may receive the indication of the group change via the communication interface 713 and while the wireless data connection is established. In one or more instances, the content concealment platform 703 may receive the indication of the group change at the image analysis and protection module 712*a*. Additionally or alternatively, the content concealment platform 703 may determine a surface content update. In determining the surface content update, the content concealment platform 703 may determine that a visual change has occurred in content displayed by the client device 702. For example, the content concealment platform 703 may determine that the displayed content has changed from the content originally displayed at step 801. In response to receiving the indication of the group change, determining the surface content update, or a combination of both, the content concealment platform 703 may conceal some or all of the digital content shown on the display of the client device 702 based on the active user group list.

As an introduction to the content concealment process (which is described further below), the process may be initiated by an image analysis operation which is performed by the image analysis and protection module 712*a* in an event driven manner. The content concealment platform 703 may perform the image analysis operation, in some instances, by highlighting plain text regions, scene text regions, and video text regions in a bitmap, corresponding to the displayed content, using a content tagging process. The content concealment platform 703 may then use the detection and recognition module 712*b* to apply traditional optical character recognition (OCR) to the plain text, and to apply deep learning convolutional neural networks (CNN) to the scene text (e.g., text imbedded in static a graphic or image) and video text. Following the analysis operation, the content concealment platform 703 may use the image analysis and protection module 712*a* to leverage text or image detection/recognition and semantic analysis to conceal non-compliant regions or expose newly compliant regions of the displayed content (in terms of the content bitmap) based on results of the sensitive content checking module 712*c*.

To save overhead (e.g., time, processing resources, or the like), of text or image detection/recognition and semantic analysis, the image analysis and protection module 712*a* of the content concealment platform 703 may use an event driven manner to perform the analysis operation, and may leverage text detection/recognition and semantic analysis for the protection operation. As indicated above, these trigger events (e.g., events that trigger the analysis operation) may include a group level change event (e.g., a change in individuals within the camera view that results in a change in groups associated with the individuals within the camera view), a surface content update event, or a combination of the two.

With regard to the group level change, the content concealment platform 703 may receive an indication that an active group list change has been caused by a user arrival in or exit from the camera view from the user discovery module 702*a* of the client device 702. With regard to a user arrival event, as described above, in some instances, a new user may arrive in the camera view who is associated with a group identifier that might not match group identifiers corresponding to the active group list. In some of these instances, the displayed content may be improper for the arriving user. Accordingly, regions of the content may be analyzed based on their text or image type to determine whether particular content (e.g., text, image, or the like), should be concealed for the new arriving user. This is similar to User 3 and User 6 in example four, described above with regard to step 804. In some instances, the new arriving user may be assigned to an existing group in the active group list. In these instances, additional concealment might not be performed. This is similar User 5 in example two, described above with regard to step 804. With regard to a user leave event (e.g. a user leaves the camera view), in some instances, a final user in a group of the active group list may leave the camera view. In these instances, a group change indication (e.g., an indication of a change in groups associated with the users who are within the camera view) may be received indicating that text/image semantic analysis should be performed based on the users remaining in the camera view. In other words, certain content (e.g., text, images, or the like) that was previously concealed due to the leaving user may now be exposed or otherwise displayed via the client device 702. This is similar to User 7 in example three described above with regard to step 804. In other instances, a user may leave but the group may remain in the active group list, similar to User 13 in example two described above with regard to step 804. In these instances, no new content may be exposed. As a result, the content concealment platform 703 may avoid reprocessing the content in response to the user leaving if there is no change in groups associated with users remaining in the camera view (e.g., if a user with the same viewing policies still is present, the concealed content would not be changed). This may cause efficient concealment of the content due to a reduction in processing to be performed in certain situations.

With regard to the surface content update, a bitmap is generated in a video buffer by the image analysis and protection module 712*a* of the content concealment platform based on an independent computing architecture (ICA) graphic provider. As a simple example, there may be a change in the content displayed on the display of the client device 702. Accordingly, the content may have been updated to include content that should be concealed. In other instances, the surface content may have been updated to include content that might not need to be concealed. In one or more instances, the content concealment platform 703 may monitor for surface content updates continuously or at a predetermined interval (e.g., every five seconds, or the like). In one or more instances, the content concealment platform may monitor for surface content updates by determining a change in data provided by an ICA graphic provider (e.g., determining that content displayed at the client device 702 changed). These processes are further described in further detail below.

Figure 12A:
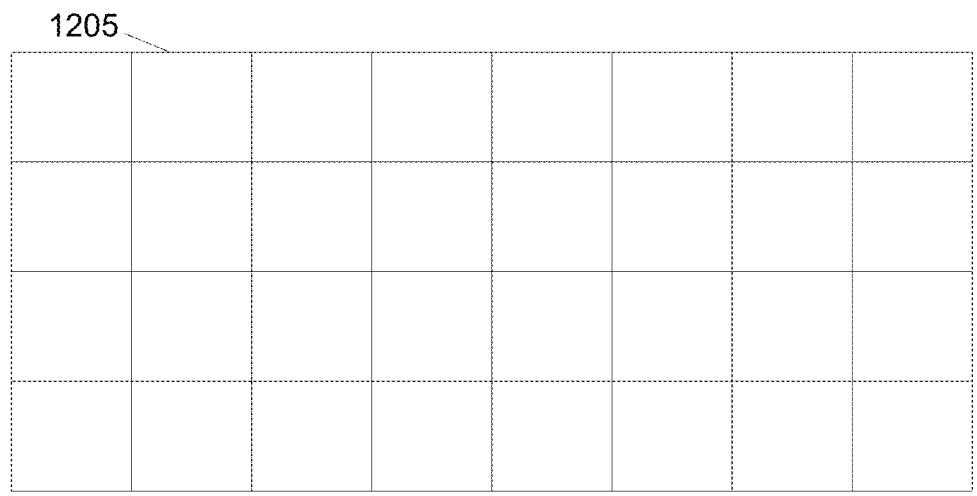
FIGS. 12A-12C depict image layouts associated with performance of real time digital content concealment.
Figure 12B:
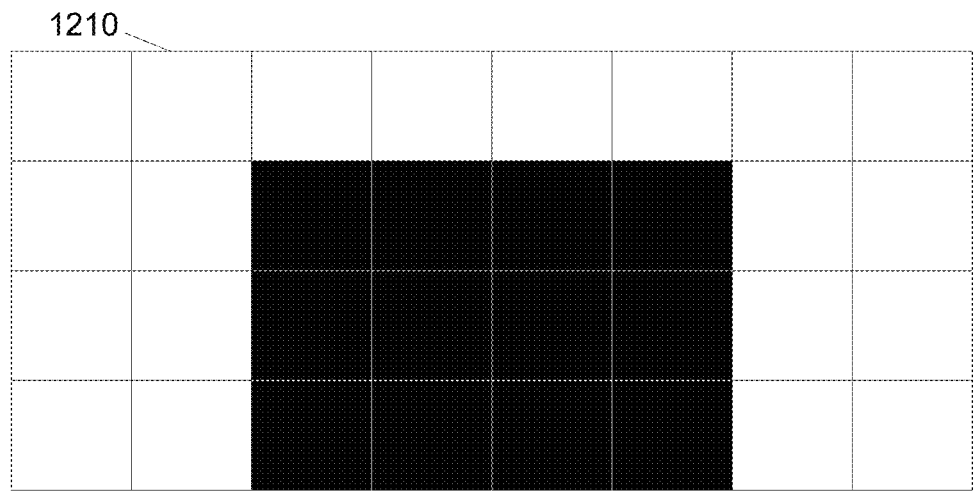

At step 808, after receiving a group change indication and/or determining a surface content update, the content concealment platform 703 may use the image analysis and protection module 712a to build an image layout of the displayed content. In building the image layout, the content concealment platform 703 may divide a bitmap corresponding to the displayed content into a batch of cells, for example a grid of 16*16 cells. Individual cells can be merged with adjacent cells to form larger regions based on whether the displayed content is static or dynamic In generating the image layout, the content concealment platform 703 may generate a bitmap similar bitmap 1205, which is displayed in FIG. 12A. In determining whether a region is dynamic, the content concealment platform 703 may determine that the region contains less than a predetermined percentage (e.g., 30%) of the cells in the grid (e.g., the 16*16 described above), is updated above a threshold frequency (e.g., 10 frames per second (FPS)), is larger than a transient minimum area (e.g., 10,000 pixels), and that relative position of the region is not changed in comparison to previously displayed frames. In determining the transient regions of the bitmap, the content concealment platform 703 may mark cells corresponding to the characteristics described above. For example, the black cells in bitmap 1210, shown in FIG. 12B, may be marked as transient regions of the bitmap 1210, whereas the remaining regions may be marked as static regions. In one or more instances, the regions may be marked by associating them with flags indicative of the region type. Additionally or alternatively, a database may be maintained in which the regions are identified along with their region type.

Figure 12C:
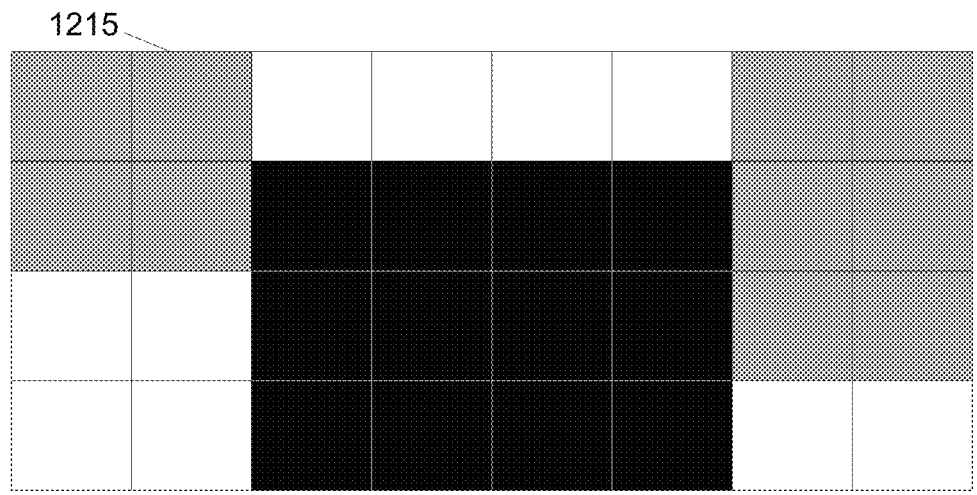

After differentiating between transient and static regions of the bitmap, the content concealment platform 703 may use the image analysis and protection module 712a to determine whether the static regions contain scene text (e.g., text embedded in a rich background such as a video, flash, graphics interchange format (GIF) image, or the like) or plain text (e.g., text displayed on a simple background) based on whether the cells contain lossless text (which is defined as follows). To determine whether a cell is lossless, the content concealment platform 703 may use the image analysis and protection module 712a to determine differences in pixel values per cell. In one or more instances, in determining the pixel values, the content concealment platform 703 may determine a number, for each pixel, that is representative of the brightness of the pixel (e.g., 0, 150, 250, or the like). If the content concealment platform 703 determines that a cell contains primarily (e.g., over 50%) differences in pixel values that exceed a threshold, the content concealment platform 703 may determine that the cell includes lossless text. If the content concealment platform 703 determines that the cell contains lossless text, it may determine that the cell contains scene text (e.g., if the cell contains lossless text it contains scene text). If the content concealment platform 703 determines that the cell does not contain lossless text, it may determine that the cell may contain plain text (e.g., if the cell does not contain lossless text it contains plain text). After determining whether each cell of the bitmap contains video text, plain text, and/or scene text, the content concealment platform 703 may tag the cells accordingly to generate a bitmap such as bitmap 1215, which is shown in FIG. 12C. For example, the black cells of bitmap 1215 may contain video text, the shaded cells of bitmap 1215 may contain plain text, and the unshaded cells of bitmap 1215 may contain scene text.

Figure 13A:
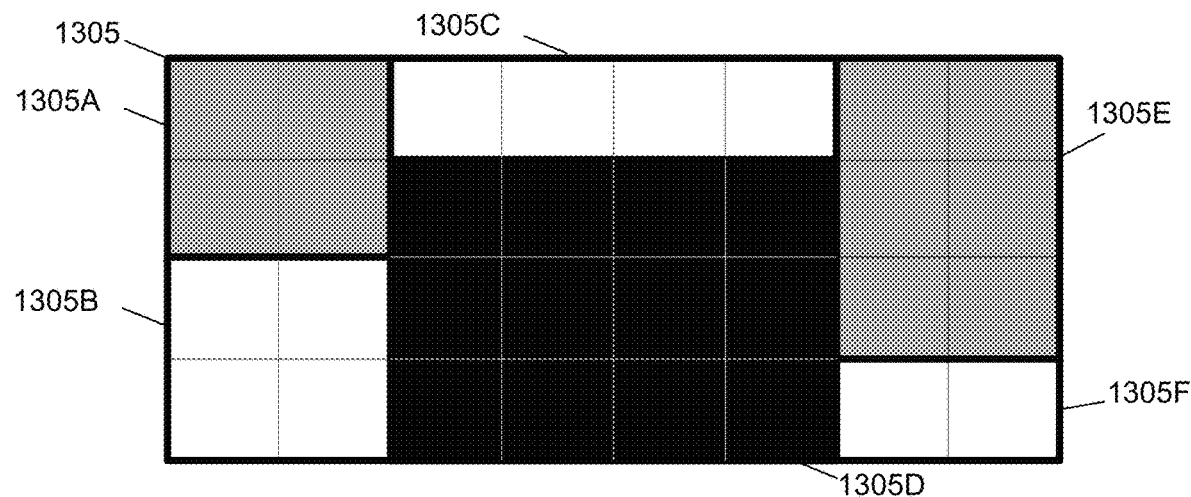
FIGS. 13A-13B depict additional image layouts associated with performance of real time digital content concealment.

As final steps for building the image layout, the content concealment platform 703 may generate shapes (e.g., rect-angles) corresponding to similarly tagged cells. For example, a rectangle of cells that all contain plain text may be tagged. In one or more instances, the content concealment platform 703 may tag the cells using the following format: Rectangle ID: position parameters {x,y}, width, height, and candidate tag. By tagging the cells, the content concealment platform 103 may be able to group cells into larger shapes that may be analyzed as a whole based on the type of text that they contain and the content concealment platform 103 may be able to locate the rectangles using the identifier coordinates. In these instances, {x,y} may stand for the coordinates of a left-top vertex of the rectangle, relative to the display screen. For example, Rectangle 1: {(0,0), 32, 32, "plain text"}; Rectangle 2: {(32,0), 64, 16, "scene text"}; Rectangle 5: {(32,16), 64, 48, "video text"}, and so on. Each rectangle may be a candidate bitmap for text semantic analysis and concealment of content. In generating these rectangles, the content concealment platform 703 may generate an image layout similar to image layout 1305, which is shown in FIG. 13A. For example, rectangles 1305A and 1305E may correspond to plain text, rectangles 1305B, 1305C, and 1305F may correspond to scene text, and rectangle 1305D may correspond to video text. It should be understood that although the image layout is discussed in terms of rectangles, any shapes could be used to generate the image layout (e.g., squares, circles, or the like). Once these rectangles are determined, the content concealment platform 703 may be complete with construction of the image layout, and may send the image layout to the text or image detection and recognition module 712b for text or image semantic analysis. Once an image layout for the displayed content is initially constructed, rather than performing the image layout each time a surface content update is determined, the content concealment platform 703 may skip step 808 and proceed directly from step 807 to step 809.

Figure 13B:
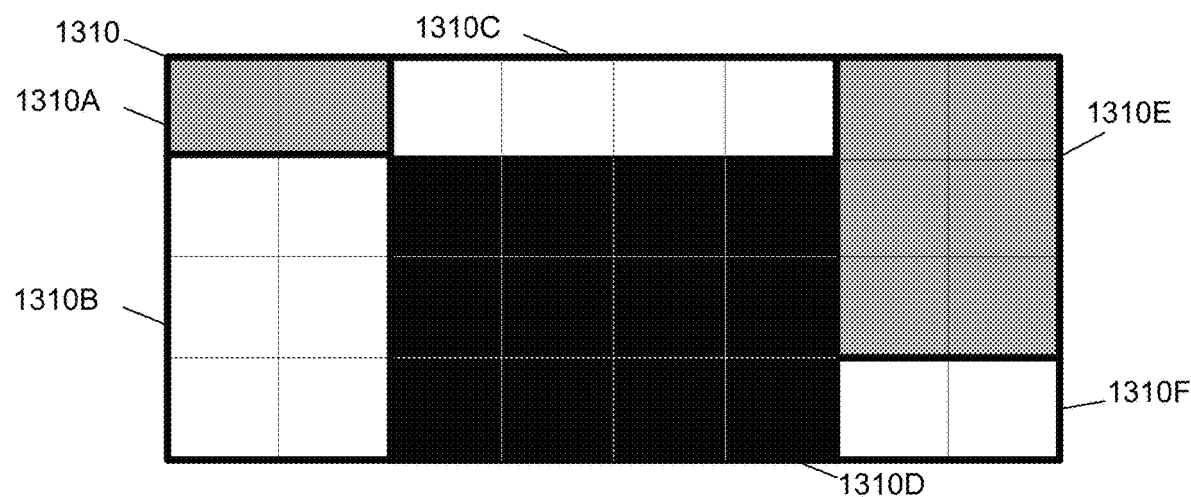

At step 809, in response to determining a surface content update and once the image layout has been initially built, the content concealment platform 703 may determine whether the image layout should be adjusted due to the surface content update. In some instances, the content concealment platform 703 may determine that a surface content update occurred, but might not modify the image layout. In some instances, however, the content concealment platform 703 may determine that the image layout should be adjusted in response to the surface content update. For example, after a surface content update, the first two cells in rectangle 1305A may still correspond to plain text, but the other two cells adjacent to rectangle 1305B may correspond to scene text. Accordingly, the content concealment platform 703 may modify the image layout to resemble image layout 1310, as shown in FIG. 13B. For example, rectangles 1310A and 1310E may contain plain text, rectangles 1310B, 1310C, and 1310F may correspond to scene text, and rectangle 1310D may correspond to video text.

In some instances, the content concealment platform 703 may determine that the image layout should be adjusted in response to a new user group. For example, each time an indication of a new user group is received, the content concealment platform 703 may recalculate the image layout. If the content concealment platform 703 determines that there are differences between the recalculated image layout and the previously determined image layout, the content concealment platform 703 may send all rectangles in the bitmap for processing using text semantic analysis. If the content concealment platform 703 determines that there are no differences between the recalculated image layout and the previously determined image layout, then the content concealment platform 703 may send only the rectangles corresponding to changes from the content surface update (e.g., new content, layout changes, or the like from the surface content update) for text semantic analysis. For example, if image layout 1305 was modified to resemble image layout 1310, the content concealment platform 703 may determine that only rectangles 1310A and 1310B should be resent for text semantic analysis.

At step 810, after building and/or updating the image layout at steps 808/809, the content concealment platform 703 may perform text detection and recognition using the detection and recognition module 712b. In performing the text detection and recognition, the content concealment platform 703 may use different method of text detection and recognition for different rectangles in the image layout based on the text type contained in each rectangle. For example, in instances where a rectangle of the image layout contains plain text, the content concealment platform 703 may perform traditional OCR techniques to determine the text in that particular rectangle. In instances where a rectangle of the image layout contains scene text and/or video text, the content concealment platform 703 may use R-CNN object detection and bi-directional long short-term memory (BLSTM) for text sequence detection. These techniques may be part of a deep learning network for scene and video text constructed by the detection and recognition module 712b. In performing these various techniques on the image layout, the content concealment platform 703 may return all detected text contained in the displayed content.

At step 811, the content concealment platform 703 may use the detection and recognition module 712b to generate proposed text areas corresponding to position parameters of the text determined at step 810. For example, in generating the proposed text areas, the content concealment platform 703 may mark, for example, top left coordinates, width, and height of the text in terms of pixels. These proposed text areas may be associated with the text determined at step 810, and may be sent to the sensitive content checking module 712c for further processing.

At step 812, the content concealment platform 703 may use the sensitive content checking module 712c to determine whether any of the text determined at step 810 should be concealed. In some instances, the content concealment platform 703 may determine whether the text should be concealed based on the active group list. For example, each group may have a dictionary of words to be concealed, word patterns that should be concealed, specific concealment policies, or the like. The content concealment platform 703 may apply these group specific rules to the determined text for each group included in the active group list. In one or more instances, text may be an exact match with a word in the dictionary of words to be concealed. Additionally or alternatively, the text may be a fuzzy or flexible match to a word pattern that should be concealed (e.g., a regular expression (a sequence of characters that comprise a search pattern)). Additional or alternatively, the text may be a semantic match with a word that should be concealed based on application of deep learning algorithms In each of these instances, the content concealment platform 703 may determine that the text should be concealed from display. It should be understood that in determining whether any of the text should be concealed, the content concealment platform 703 may determine lines of text in addition to individual words. In one or more instances, in addition to or as an alternative to determining whether any of the text determined at step 810 should be concealed, the content concealment platform 703 may determine whether any previously concealed text should be exposed (e.g., because a final user in a particular group has left the camera view).

Referring to FIG. 8B, at step 813, the content concealment platform 703 may calculate a position for the words to be concealed. In one or more instances, the content concealment platform 703 may calculate the position for the words to be concealed by determining the proposed text areas (determined at step 811) for the words identified for concealment at step 812.

At step 814, after determining the positions of the words to be concealed at step 813, the content concealment platform 703 may use the image analysis and protection module 712a to conceal or expose text or other content for display accordingly. In concealing the text, the content concealment platform 703 may use the image analysis and protection module 712a to capture a full-screen bitmap from a video buffer and may cache the bitmap as a base frame. In caching the bitmap as a base frame, the content concealment platform 703 may store the bitmap as a point of reference that may be used to return concealed content to its original state. In one or more instances, the base frame may also update along with an ICA graphics surface update.

The image analysis and protection module 712a may receive an indication from the sensitive content checking module 712c indicating which portions of the content should be concealed and a solid color bitmap may be assembled (e.g., black, or the like) with a size equal to a target rectangle corresponding to the portion of content to be concealed. The image analysis and protection module 712a may then update the black bitmap to the corresponding position of a screen of the client device 702 via an ICA stack.

In instances where the black bitmap should be removed in order to reveal text or other content in accordance with a particular individuals exit, the image analysis and protection operation may obtain the original bitmap from the base frame, and may update the original bitmap to the corresponding position of the screen of the client device 702 via an ICA stack.

In one or more instances, the content concealment platform 703 may generate and send one or more commands to the client device 702 directing the client device 702 to display the content with portions of the content concealed. In these instances, the content concealment platform 703 may send the one or more commands via the communication interface 713 and while the wireless data connection is established.

Figure 11B:
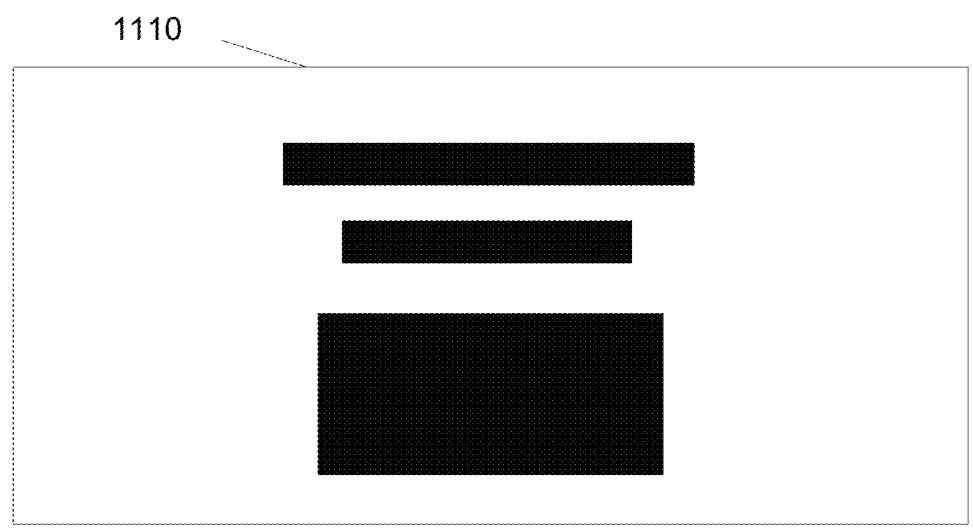

At step 815, the client device 702 may display the content with particular portions concealed. In one or more instances, in displaying the content at step 815, the client device 702 may display a graphical user interface similar to graphical user interface 1110, which is shown in FIG. 11B. For example, the confidential information, sensitive words, and/or digital content that were previously displayed may now be concealed. In one or more instances, the client device 702 may receive the one or more commands directing the client device 702 to display the content with portions concealed, and the client device 702 may display the content in response to the one or more commands.

Although steps 801-815 are primarily described with regard to concealing text, it should be understood that these steps may similarly be used to conceal other non-textual portions of displayed content (e.g., images, video, or the like). Similarly, these steps are not limited to concealing a single word, but rather also apply to lines of text that may be concealed based on a deep learning text semantic analysis that indicates that the lines of text should be concealed Subsequently, the event sequence may end, and the content concealment platform 703 may continue to conceal text based on user groups as described above. Accordingly, a method for real time text concealment is presented. Additionally, rather than merely determining that particular text should be concealed from certain individuals and thus consistently concealing the text from everyone, the content concealment platform 703 may provide a method for concealing text based on policies corresponding to various user groups. Accordingly, the quality of content concealment (and similarly the security and secrecy of the concealed content) may be improved.

Figure 9:
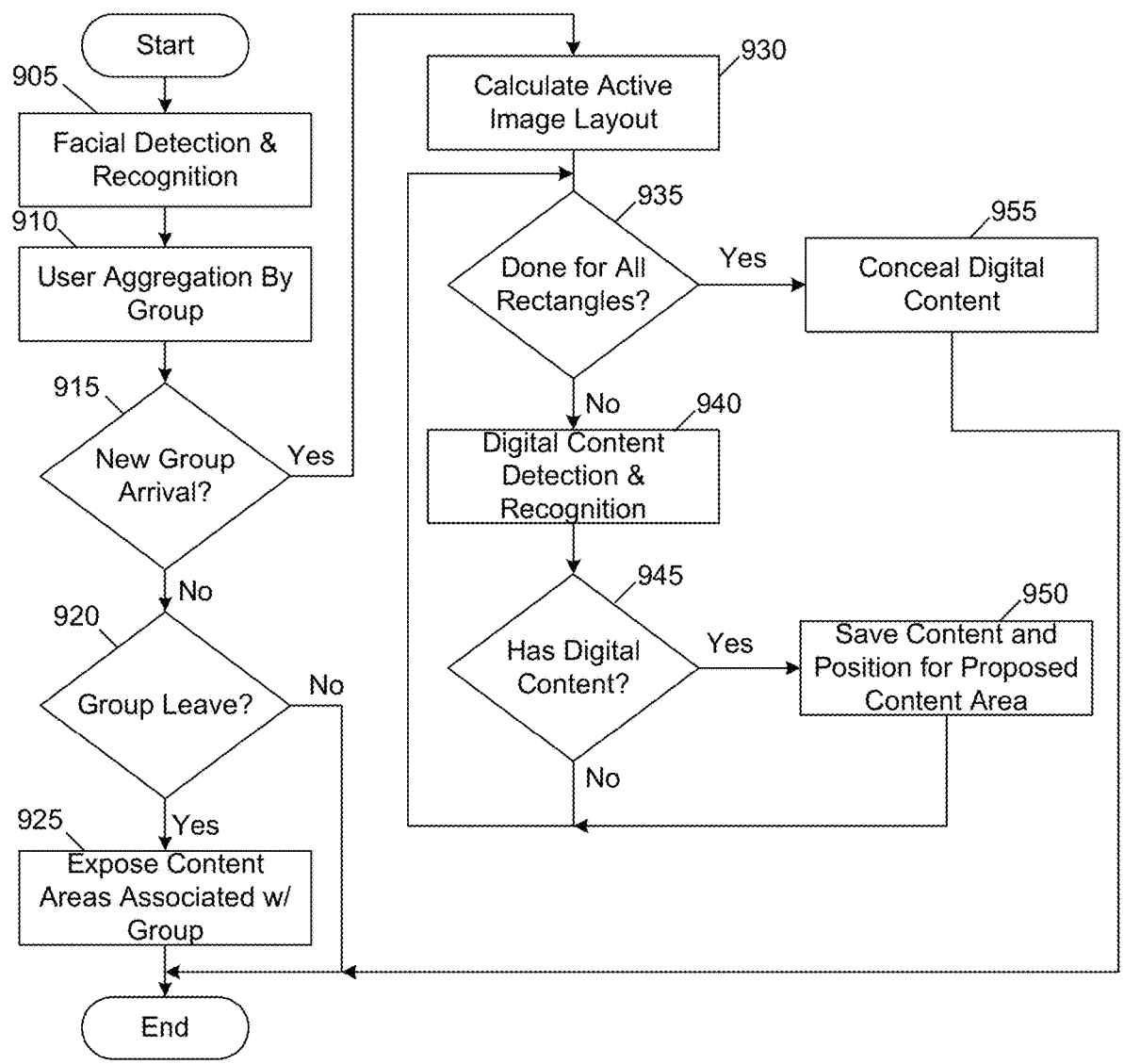
FIG. 9 depicts an illustrative method for performing real time digital content concealment in response to a change in user groups in accordance with one or more example embodiments.

FIG. 9 depicts an illustrative method for performing real time text concealment based on changes in user groups in accordance with one or more example embodiments. Referring to FIG. 9, at step 905, a first computing device having at least one processor, a communication interface, and memory may perform facial detection and recognition. Actions performed at step 905 may be similar to those described above with regard to step 802. At step 910, the first computing device may aggregate the recognized users by group. Actions performed at step 910 may be similar to those described above with regard to step 803. At step 915, the first computing device may determine whether a user from a new group has arrived. If a new user has arrived, the first computing device may send an indication of the group change to a second computing device, and may proceed to step 930. If a new user has not arrived, the first computing device may proceed to step 920. Actions performed at step 915 may be similar to those described above with regard to steps 804-806.

At step 920, the first computing device may determine whether all users from a previously represented group have left the view of the camera of the client device. If all users from a previously represented group have not left, the method may end. If all users from a previously represented group have left, the first computing device may send an indication of the group change to the second computing device and may proceed to step 925. Actions performed at step 920 may be similar to those described above with regard to steps 804-806.

At step 925, the second computing device may cause previously concealed text areas associated with the previously represented group to be exposed. Actions performed at step 925 are described further above with regard to steps 807-814. At step 930, the second computing device may calculate an active image layout. Actions performed at step 930 may be similar to those described above with regard to steps 808 and 809. At step 935, the second computing device may determine whether text detection and recognition has been performed on all rectangles included in the active image layout. If text detection and recognition has been performed on all rectangles in the active image layout, the second computing device may proceed to step 955. If text detection and recognition has not been performed on all rectangles in the active image layout, the second computing device may proceed to step 940.

At step 940, the second computing device may perform text detection and recognition on a rectangle of the active image layout. Actions performed at step 940 may be similar to those described above with regard to steps 810. At step 945, the second computing device may determine, based on the text detection and recognition, whether the rectangle contains text. If the rectangle does not contain text, the second computing device may return to step 935. If the rectangle does contain text, the second computing device may proceed to step 950.

At step 950, the second computing device may save the text and a position for a proposed text area corresponding to the text. Actions performed at step 950 may be similar to those described above with regard to steps 811. At step 955, once all rectangles of the active image layout have been analyzed, the second computing device may identify words that should be concealed, and may conceal them accordingly. Actions performed at step 955 may be similar to those described above with regard to steps 812-814. Subsequently, the method may end.

Figure 10:
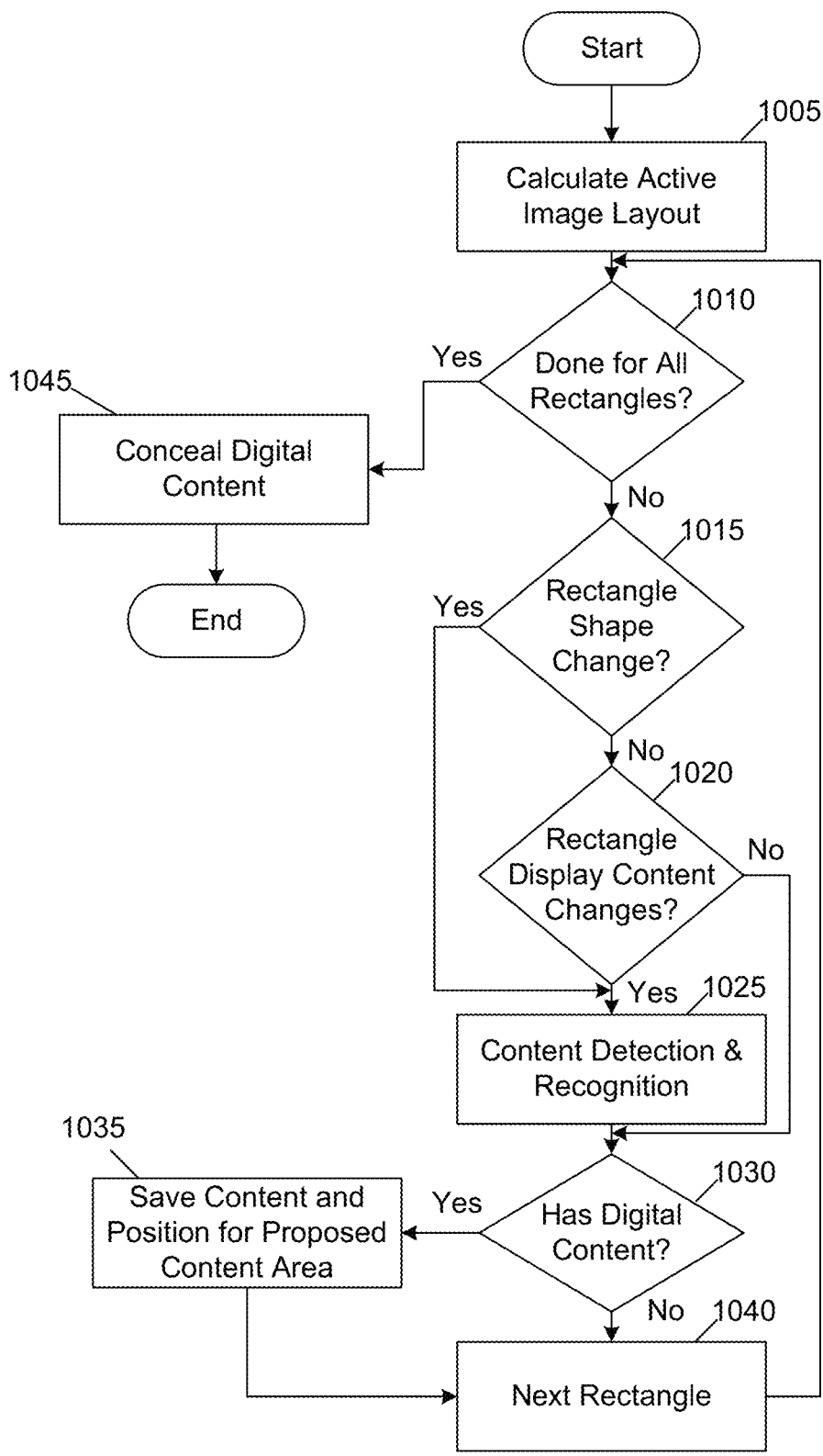
FIG. 10 depicts an illustrative method for performing real time digital content concealment in response to a surface content change in accordance with one or more example embodiments.

FIG. 10 depicts an illustrative method for performing real time text concealment based on surface content updates in accordance with one or more example embodiments. Referring to FIG. 10, at step 1005, a computing device having at least one processor, a communication interface, and memory may calculate an active image layout in response to an update to content currently being displayed (referred to as surface content). Actions performed at step 1005 may be similar to those described above with regard to step 808. At step 1010, the computing device may determine whether all rectangles included in the active image layout have been analyzed. If all rectangles have been analyzed, the computing device may proceed to step 1045. If all rectangles have not been analyzed, the computing device may proceed to step 1015.

At step 1015, the computing device may determine whether any rectangles change shape based on the surface content update. If rectangles have changed shape, the computing device may proceed to step 1025. If rectangles have not changed shape, the computing device may proceed to step 1020. Actions performed at step 1015 may be similar to those described above with regard to step 809.

At step 1020, the computing device may determine whether the surface content update caused content changes on the display. If there were no content changes, the computing device may proceed to step 1030. If there were content changes, the computing device may proceed to step 1025. Actions performed at step 1020 may be similar to those described above with regard to step 810.

At step 1025, the computing device may perform text detection and recognition. Actions described at step 1025 may be similar to those described above with regard to step 810. At step 1030, the computing device may determine whether the rectangle has text. If the rectangle does not have text, the computing device may proceed to step 1040. If the rectangle does have text, the computing device may proceed to step 1035. Actions performed at step 1025 may be similar to those described above with regard to step 810.

At step 1035, the computing device may save the text and a position of the text as a proposed text area. Actions performed at step 1035 may be similar to those described above with regard to step 811. At step 1040, the computing device may proceed to another rectangle in the active image layout.

At step 1045, the computing device may identify words in the saved texts that should be concealed, and may conceal the words accordingly. Actions performed at step 1045 may be similar to those described above with regard to step 812-814. Subsequently, the method may end.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

What is claimed is:

1. A system comprising:
at least one processor; and
a memory storing computer readable instructions that, when executed by the at least one processor, cause the system to:
in response to detecting a user within view of an image capture device of a client device, perform a first type of text recognition on a first region of digital content displayed by the client device and a second type of text recognition on a second region of the digital content displayed by the client device, wherein the first type of text recognition is determined based on a first type of content items contained in the first region and the second type of text recognition is determined based on a second type of content items contained in the second region;
determine, based at least in part on rules corresponding to the user, content items within the digital content to be concealed;
modify the digital content so as to conceal the content items from view of the user while the client device displays the digital content; and
display, via the client device, the modified digital content to the user, wherein the modified digital content does not contain the determined content items.

2. The system of claim 1, wherein the instructions, when executed by the at least one processor, further cause the system to:
establish a wireless data connection with the client device; and
receive, while the wireless data connection is established, an indication of a first change in groups to which present users belong, wherein the first type of text recognition and the second type of text recognition are performed in response to receiving the indication of the first change in the groups to which present users belong.

3. The system of claim 2, wherein the instructions, when executed by the at least one processor, further cause the system to identify, based on the groups to which present users belong, the one or more content items within the digital content to be concealed.

4. The system of claim 3, wherein identifying, based on the groups to which present users belong, the one or more content items to be concealed comprises determining that text recognized in the digital content corresponds to words identified by policies corresponding to each group to which present users belong.

5. The system of claim 2, wherein the groups to which present users belong are defined based on user age or employment status of the present users.

6. The system of claim 1, wherein the first region contains plain text, the second region contains text in an image, and a third region contains text in video.

7. The system of claim 2, wherein the instructions, when executed by the at least one processor, further cause the system to monitor, at a predefined interval, the groups to which present users belong and the digital content to determine the first change.

8. The system of claim 2, wherein the instructions, when executed by the at least one processor, further cause the system to:
determine, in response to a second change in groups to which present users belong, that the modified digital content should be modified to allow display of the determined content items; and
modify the modified digital content to allow display of the determined content items by returning the modified digital content to a pre-modification state.

9. The system of claim 2, wherein the instructions, when executed by the at least one processor, further cause the system to:
determine, in response to a second change in the modified digital content, that the modified digital content contains one or more additional content items to be concealed; and
modify the modified digital content to cause positions of the one or more additional content items to be concealed to correspond to a uniform color.

10. The system of claim 2, wherein the first change in groups to which present users belong is detected by:
performing facial recognition to determine an identifier corresponding to each user in view of the image capture device of the client device;
and
determining at least one identifier corresponding to a new group to which present users belong by comparison of the determined identifiers to a stored database of correlations between a list of identifiers and a list of groups to which present users belong.

11. A method comprising:
in response to detecting a user within view of an image capture device of a client device, performing a first type of text recognition on a first region of digital content displayed by the client device and a second type of text recognition on a second region of the digital content displayed by the client device, wherein the first type of text recognition is determined based on a first type of content items contained in the first region and the second type of text recognition is determined based on a second type of content items contained in the second region;
determining, based at least in part on rules corresponding to the user, content items within the digital content to be concealed;
modifying the digital content so as to conceal the content items from view of the user while the client device displays the digital content; and
display, via the client device, the modified digital content to the user, wherein the modified digital content does not contain the determined content items.

12. The method of claim 11, further comprising:
establishing a wireless data connection with the client device; and
receiving, while the wireless data connection is established, an indication of a first change in groups to which present users belong, wherein the first type of text recognition and the second type of text recognition are performed in response to receiving the indication of the first change in the groups to which present users belong.

13. The method of claim 12, further comprising identifying, based on the groups to which present users belong, the one or more content items to be concealed, wherein identifying, based on the groups to which present users belong, the one or more content items to be concealed comprises determining that text recognized in the digital content corresponds to:
words identified by policies corresponding to each group to which present users belong.

14. The method of claim 12, wherein the groups to which present users belong are defined based on user age or employment status of present users.

15. The method of claim 11, wherein the first region contains plain text, the second region contains text in an image, and a third region contains text in video.

16. The method of claim 12, further comprising monitoring, at a predefined interval, the groups to which present users belong and the digital content to determine the first change.

17. The method of claim 12, further comprising:
determining, in response to a second change in groups to which present users belong, that the modified digital content should be modified to allow display of the content items; and
modifying the modified digital content to allow display of the determined content items by returning the modified digital content to a pre-modification state.

18. The method of claim 12, further comprising:
determining, in response to a second change in the modified digital content, that the modified digital content contains one or more additional content items to be concealed; and
modifying the modified digital content to cause positions of the one or more additional content items to be concealed to correspond to a uniform color.

19. The method of claim 12, wherein the first change in groups to which present users belong is detected by:
performing facial recognition to determine an identifier corresponding to each user in view of the image capture device of the client device;
and
determining at least one identifier corresponding to a new group to which present users belong by comparison of the determined identifiers to a stored database of correlations between a list of identifiers and a list of groups to which present users belong.

20. One or more non-transitory computer-readable media storing instructions that, when executed by a system comprising at least one processor, a communication interface, and memory, cause the system to:
in response to detecting a user within view of an image capture device of a client device, perform a first type of text recognition on a first region of digital content displayed by the client device and a second type of text recognition on a second region of the digital content displayed by the client device, wherein the first type of text recognition is determined based on a first type of content items contained in the first region and the second type of text recognition is determined based on a second type of content items contained in the second region;
determine, based at least in part on rules corresponding to the user, content items within the digital content to be concealed;
modify the digital content so as to conceal the content items from view of the user while the client device displays the digital content; and
display, via the client device, the modified digital content to the user, wherein the modified digital content does not contain the determined content items.

* * * * *